United States Patent
Adachi

(10) Patent No.: US 8,086,401 B2
(45) Date of Patent: Dec. 27, 2011

(54) METHOD FOR TRANSMITTING INFORMATION ON POSITION ON DIGITAL MAP AND DEVICE USED FOR THE SAME

(75) Inventor: Shinya Adachi, Yokohama (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 11/133,591

(22) Filed: May 20, 2005

(65) Prior Publication Data

US 2005/0216189 A1 Sep. 29, 2005

Related U.S. Application Data

(62) Division of application No. 10/169,644, filed on Sep. 23, 2002, now Pat. No. 6,931,319.

(30) Foreign Application Priority Data

Dec. 8, 2000 (JP) .................. 2000-375320
Jul. 19, 2001 (JP) .................. 2001-220062

(51) Int. Cl.
G01C 21/30 (2006.01)
G01C 21/32 (2006.01)
G05D 1/00 (2006.01)

(52) U.S. Cl. ............ 701/208; 701/1; 701/207; 701/209; 701/210; 701/224

(58) Field of Classification Search .................. 701/208, 701/210, 214; 340/995.1, 995.11, 995.14, 340/995.22, 995

See application file for complete search history.

(56) References Cited

U.S. PATENT DOCUMENTS

| | | | |
|---|---|---|---|
| 4,807,127 A | 2/1989 | Tehmoku et al. |
| 4,819,175 A | 4/1989 | Wuttke |
| 4,893,246 A | 1/1990 | Iihoshi et al. |
| 4,924,699 A | 5/1990 | Kuroda et al. |
| 4,930,888 A | 6/1990 | Freisleben et al. |
| 4,963,864 A | 10/1990 | Iihoshi et al. |
| 4,963,865 A | 10/1990 | Ichikawa et al. |
| 4,984,168 A | 1/1991 | Neukrichner et al. |
| 5,040,122 A | 8/1991 | Neukirchner et al. |
| 5,046,011 A | 9/1991 | Kakihara et al. |

(Continued)

FOREIGN PATENT DOCUMENTS

CN 1181565 A 5/1998

(Continued)

OTHER PUBLICATIONS

JP 09-304093 in view of JPO English Translation.*

(Continued)

*Primary Examiner* — Khoi Tran
*Assistant Examiner* — Ian Jen
(74) *Attorney, Agent, or Firm* — Pearne & Gordon LLP

(57) ABSTRACT

A method of transmitting position information of a digital map capable of transmitting a position on a digital map efficiently and accurately in which a transmitting side transmits position information including coordinate series information for specifying a vector shape on a digital map and a receiving side execute map matching by the coordinate series information to thereby identify the vector shape on the digital map, the coordinate series information is transmitted by adding azimuth information of a coordinate point included in the coordinate series information thereto. By transmitting shape data by adding the azimuth information thereto, accuracy of matching can be promoted and necessary time for matching can be shortened.

4 Claims, 39 Drawing Sheets

U.S. PATENT DOCUMENTS

| | | | |
|---|---|---|---|
| 5,067,082 A | 11/1991 | Nimura et al. | |
| 5,214,757 A | 5/1993 | Mauney et al. | |
| 5,307,278 A | 4/1994 | Hermans et al. | |
| 5,311,195 A | 5/1994 | Mathis et al. | |
| 5,406,642 A | 4/1995 | Maruya | |
| 5,442,559 A | 8/1995 | Kuwahara et al. | |
| 5,488,559 A | 1/1996 | Seymour | |
| 5,581,259 A | 12/1996 | Schipper | 342/451 |
| 5,742,923 A | 4/1998 | Odagawa | |
| 5,815,118 A | 9/1998 | Schipper | 342/451 |
| 5,831,552 A | 11/1998 | Sogawa et al. | |
| 5,839,087 A * | 11/1998 | Sato | 701/207 |
| 5,848,374 A | 12/1998 | Wakabayashi et al. | |
| 5,862,511 A | 1/1999 | Croyle et al. | |
| 5,867,804 A * | 2/1999 | Pilley et al. | 701/120 |
| 5,899,954 A | 5/1999 | Sato | |
| 5,908,466 A * | 6/1999 | Veugen et al. | 701/224 |
| 5,948,043 A | 9/1999 | Mathis | |
| 5,986,604 A | 11/1999 | Nichols et al. | |
| 5,995,023 A | 11/1999 | Kreft | |
| 6,002,981 A | 12/1999 | Kreft | |
| 6,035,253 A | 3/2000 | Hayashi et al. | |
| 6,038,559 A | 3/2000 | Ashby et al. | |
| 6,058,350 A | 5/2000 | Ihara | |
| 6,061,627 A * | 5/2000 | Sato | 701/207 |
| 6,108,603 A | 8/2000 | Karunanidhi | |
| 6,115,668 A | 9/2000 | Kaneko et al. | |
| 6,169,956 B1 * | 1/2001 | Morimoto et al. | 701/209 |
| 6,178,377 B1 * | 1/2001 | Ishihara et al. | 701/200 |
| 6,188,959 B1 * | 2/2001 | Schupfner | 701/217 |
| 6,230,100 B1 | 5/2001 | Geier | |
| 6,240,368 B1 | 5/2001 | Kreft | |
| 6,281,807 B1 * | 8/2001 | Kynast et al. | 340/905 |
| 6,324,467 B1 * | 11/2001 | Machii et al. | 701/200 |
| 6,324,468 B1 | 11/2001 | Meis et al. | |
| 6,333,703 B1 | 12/2001 | Alewine et al. | |
| 6,334,089 B2 | 12/2001 | Hessing | |
| 6,345,229 B1 | 2/2002 | Honkomp et al. | |
| 6,381,536 B1 * | 4/2002 | Satoh et al. | 701/208 |
| 6,449,557 B2 * | 9/2002 | Ata et al. | 701/208 |
| 6,556,920 B2 * | 4/2003 | Kaneko et al. | 701/208 |
| 6,920,392 B2 * | 7/2005 | Adachi | 701/208 |
| 6,931,319 B2 * | 8/2005 | Adachi | 701/208 |
| 2001/0001847 A1 | 5/2001 | Hessing | |
| 2001/0007088 A1 | 7/2001 | Winter et al. | |
| 2001/0012981 A1 | 8/2001 | Yamashita et al. | |
| 2001/0016796 A1 * | 8/2001 | Ata et al. | 701/208 |
| 2001/0019420 A1 * | 9/2001 | Sanbongi et al. | 358/1.15 |
| 2001/0037177 A1 | 11/2001 | Nishida et al. | |
| 2001/0047242 A1 * | 11/2001 | Ohta | 701/210 |
| 2004/0215387 A1 * | 10/2004 | Adachi et al. | 701/208 |
| 2004/0220727 A1 * | 11/2004 | Adachi | 701/208 |
| 2005/0131632 A1 * | 6/2005 | Adachi | 701/200 |
| 2005/0131642 A1 * | 6/2005 | Adachi | 701/210 |

FOREIGN PATENT DOCUMENTS

| | | |
|---|---|---|
| EP | 0 478 438 | 12/1995 |
| EP | 0 875 877 A2 | 11/1998 |
| EP | 0-921-509 A2 | 6/1999 |
| EP | 0 921 509 A2 | 9/1999 |
| EP | 1 022 578 A2 | 7/2000 |
| EP | 1 098 168 A2 | 5/2001 |
| EP | 1 102 036 A1 | 5/2001 |
| EP | 1 122 517 A2 | 8/2001 |
| EP | 1 167 923 A2 | 1/2002 |
| JP | 04-034653 A | 2/1992 |
| JP | 07-287749 A | 10/1995 |
| JP | 09-212085 A | 8/1997 |
| JP | 09 304093 A | 11/1997 |
| JP | 11-51679 | 2/1999 |
| JP | 11-283158 A | 10/1999 |
| JP | 11-283163 A | 10/1999 |
| JP | 11-328378 | 11/1999 |
| JP | 11-352880 A | 12/1999 |
| JP | 2000-57478 | 2/2000 |
| JP | 2001-41757 | 2/2001 |
| JP | 2001-66146 | 3/2001 |
| WO | WO 98/27530 | 6/1998 |
| WO | WO 98/45724 | 10/1998 |
| WO | WO 98/54682 | 12/1998 |
| WO | WO 99/24787 | 5/1999 |
| WO | WO 99/56081 | 11/1999 |
| WO | WO 99/56264 | 11/1999 |
| WO | WO 00/08616 | 2/2000 |
| WO | WO 00/49530 | 8/2000 |
| WO | WO 00/50845 | 8/2000 |
| WO | WO 01/18768 A1 | 3/2001 |
| WO | WO 01/18769 A1 | 3/2001 |
| WO | WO 01/50089 A1 | 7/2001 |
| WO | WO 01/50437 A1 | 7/2001 |
| WO | WO 01/75838 A1 | 10/2001 |
| WO | WO 01/84081 A1 | 11/2001 |
| WO | WO 02/04894 A1 | 1/2002 |
| WO | WO 02/14788 A1 | 2/2002 |
| WO | WO 02/16874 A1 | 2/2002 |

OTHER PUBLICATIONS

Abstract of U.S. Patent No. 4,040,740: Date issued: Aug. 1977.
Abstract of U.S. Patent No. 4,063,237: Date issued: Dec. 1977.
Abstract of U.S. Patent No. 4,151,656: Date issued: May 1979.
Abstract of U.S. Patent No. 4,196,474: Date issued: Apr. 1980.
Abstract of U.S. Patent No. 4,251,797: Date issued: Feb. 1981.
Abstract of U.S. Patent No. 4,304,487: Date issued: Dec. 1981.
Abstract of U.S. Patent No. 4,725,957: Date issued: Feb. 1988.
Abstract of U.S. Patent No. 4,728,888: Date issued: Mar. 1988.
Abstract of U.S. Patent No. 4,729,172: Date issued: Mar. 1988.
Abstract of U.S. Patent No. 4,731,727: Date issued: Mar. 1988.
Abstract of U.S. Patent No. 4,733,179: Date issued: Mar. 1988.
Abstract of U.S. Patent No. 4,782,453: Date issued: Nov. 1988.
Abstract of U.S. Patent No. 4,784,237: Date issued: Nov. 1988.
Abstract of U.S. Patent No. 4,807,264: Date issued: Feb. 1989.
Abstract of U.S. Patent No. 4,835,870: Date issued: Jun. 1989.
Abstract of U.S. Patent No. 4,989,333: Date issued: Feb. 1991.
Abstract of U.S. Patent No. 5,020,143: Date issued: May 1991.
Abstract of U.S. Patent No. 5,021,962: Date issued: Jun. 1991.
Abstract of U.S. Patent No. 5,059,965: Date issued: Oct. 1991.
Abstract of U.S. Patent No. 5,095,532: Date issued: Mar. 1992.
Abstract of U.S. Patent No. 5,146,219: Date issued: Sep. 1992.
Abstract of U.S. Patent No. 5,148,604: Date issued: Sep. 1992.
Abstract of U.S. Patent No. 5,173,691: Date issued: Dec. 1992.
Abstract of U.S. Patent No. 5,177,685: Date issued: Jan. 1993.
Abstract of U.S. Patent No. 5,182,555: Date issued: Jan. 1993.
Abstract of U.S. Patent No. 5,184,123: Date issued: Feb. 1993.
Abstract of U.S. Patent No. 5,193,214: Date issued: Mar. 1993.
Abstract of U.S. Patent No. 5,247,252: Date issued: Sep. 1993.
Abstract of U.S. Patent No. 5,261,279: Date issued: Nov. 1993.
Abstract of U.S. Patent No. 5,279,040: Date issued: Jan. 1994.
Abstract of U.S. Patent No. 5,283,575: Date issued: Feb. 1994.
Abstract of U.S. Patent No. 5,332,180: Date issued: Jul. 1994.
Abstract of U.S. Patent No. 5,351,539: Date issued: Oct. 1994.
Abstract of U.S. Patent No. 5,396,429: Date issued: Mar. 1995.
Abstract of U.S. Patent No. 5,406,490: Date issued: Apr. 1995.
Abstract of U.S. Patent No. 5,416,711: Date issued: May 1995.
Abstract of U.S. Patent No. 5,438,687: Date issued: Aug. 1995.
Abstract of U.S. Patent No. 5,440,389: Date issued: Aug. 1995.
Abstract of U.S. Patent No. 5,465,088: Date issued: Nov. 1995.
Abstract of U.S. Patent No. 5,473,930: Date issued: Dec. 1995.
Abstract of U.S. Patent No. 5,487,009: Date issued: Jan. 1996.
Abstract of U.S. Patent No. 5,504,482: Date issued: Apr. 1996.
Abstract of U.S. Patent No. 5,508,917: Date issued: Apr. 1996.
Abstract of U.S. Patent No. 5,515,042: Date issued: May 1996.
Abstract of U.S. Patent No. 5,523,765: Date issued: Jun. 1996.
Abstract of U.S. Patent No. 5,602,542: Date issued: Feb. 1997.
Abstract of U.S. Patent No. 5,629,690: Date issued: May 1997.
Abstract of U.S. Patent No. 5,659,476: Date issued: Aug. 1997.
Abstract of U.S. Patent No. 5,703,293: Date issued: Dec. 1997.
Abstract of U.S. Patent No. 5,710,566: Date issued: Jan. 1998.
Abstract of U.S. Patent No. 5,736,941: Date issued: Apr. 1998.
Abstract of U.S. Patent No. 5,745,865: Date issued: Apr. 1998.
Abstract of U.S. Patent No. 5,748,107: Date issued: May 1998.
Abstract of U.S. Patent No. 5,757,285: Date issued: May 1998.

Abstract of U.S. Patent No. 5,797,112: Date issued: Aug. 1998.
Abstract of U.S. Patent No. 5,812,069: Date issued: Sep. 1998.
Abstract of U.S. Patent No. 5,826,212: Date issued: Oct. 1998.
Abstract of U.S. Patent No. 5,828,322: Date issued: Oct. 1998.
Abstract of U.S. Patent No. 5,842,146: Date issued: Nov. 1998.
Abstract of U.S. Patent No. 5,850,190: Date issued: Dec. 1998.
Abstract of U.S. Patent No. 5,905,451: Date issued: May 1999.
Abstract of U.S. Patent No. 5,926,118: Date issued: Jul. 1999.
Abstract of U.S. Patent No. 5,933,094: Date issued: Aug. 1999.
Abstract of U.S. Patent No. 5,933,100: Date issued: Aug. 1999.
Abstract of U.S. Patent No. 5,974,356: Date issued: Oct. 1999.
Abstract of U.S. Patent No. 5,977,885: Date issued: Nov. 1999.
Abstract of U.S. Patent No. 5,990,809: Date issued: Nov. 1999.
Abstract of U.S. Patent No. 5,995,023: Date issued: Nov. 1999.
Abstract of U.S. Patent No. 5,996,409: Date issued: Dec. 1999.
Abstract of U.S. Patent No. 6,006,161: Date issued: Dec. 1999.
Abstract of U.S. Patent No. 6,012,012: Date issued: Jan. 2000.
Abstract of U.S. Patent No. 6,031,600: Date issued: Feb. 2000.
Abstract of U.S. Patent No. 6,064,319: Date issued: May 2000.
Abstract of U.S. Patent No. 6,097,313: Date issued: Aug. 2000.
Abstract of U.S. Patent No. 6,104,480: Date issued: Aug. 2000.
Abstract of U.S. Patent No. 6,107,940: Date issued: Aug. 2000.
Abstract of U.S. Patent No. 6,107,941: Date issued: Aug. 2000.
Abstract of U.S. Patent No. 6,111,521: Date issued: Aug. 2000.
Abstract of U.S. Patent No. 6,111,523: Date issued: Aug. 2000.
Abstract of U.S. Patent No. 6,114,973: Date issued: Sep. 2000.
Abstract of U.S. Patent No. 6,137,564: Date issued: Oct. 2000.
Abstract of U.S. Patent No. 6,150,961: Date issued: Nov. 2000.
Abstract of U.S. Patent No. 6,163,752: Date issued: Dec. 2000.
Abstract of U.S. Patent No. 6,169,955: Date issued: Jan. 2001.
Abstract of U.S. Patent No. 6,169,956: Date issued: Jan. 2001.
Abstract of U.S. Patent No. 6,178,378: Date issued: Jan. 2001.
Abstract of U.S. Patent No. 6,192,314: Date issued: Feb. 2001.
Abstract of U.S. Patent No. 6,208,268: Date issued: Mar. 2001.
Abstract of U.S. Patent No. 6,212,473: Date issued: Apr. 2001.
Abstract of U.S. Patent No. 6,223,125: Date issued: Apr. 2001.
Abstract of U.S. Patent No. 6,230,099: Date issued: May 2001.
Abstract of U.S. Patent No. 6,232,917: Date issued: May 2001.
Abstract of U.S. Patent No. 6,236,336: Date issued: May 2001.
Abstract of U.S. Patent No. 6,236,933: Date issued: May 2001.
Abstract of U.S. Patent No. 6,240,368: Date issued: May 2001.
Abstract of U.S. Patent No. 6,244,111: Date issued: Jun. 2001.
Abstract of U.S. Patent No. 6,249,754: Date issued: Jun. 2001.
Abstract of U.S. Patent No. 6,266,609: Date issued: Jul. 2001.
Abstract of U.S. Patent No. 6,281,807: Date issued: Aug. 2001.
Abstract of U.S. Patent No. 6,281,808: Date issued: Aug. 2001.
Abstract of U.S. Patent No. 6,292,747: Date issued: Sep. 2001.
Abstract of U.S. Patent No. 6,293,024: Date issued: Sep. 2001.
Abstract of U.S. Patent No. 6,298,303: Date issued: Oct. 2001.
Abstract of U.S. Patent No. 6,321,158: Date issued: Nov. 2001.
Abstract of U.S. Patent No. 6,321,162: Date issued: Nov. 2001.
Abstract of U.S. Patent No. 6,324,467: Date issued: Nov. 2001.
Abstract of U.S. Patent No. 6,324,468: Date issued: Nov. 2001.
Abstract of U.S. Patent No. 6,324,888: Date issued: Dec. 2001.
Abstract of U.S. Patent No. 6,326,887: Date issued: Dec. 2001.
Abstract of U.S. Patent No. 6,327,532: Date issued: Dec. 2001.
Abstract of U.S. Patent No. 6,333,703: Date issued: Dec. 2001.
Abstract of U.S. Patent No. 6,334,089: Date issued: Dec. 2001.
Patent Abstracts of Japan, Shishido Hiroshi, "Method for Correcting Current Position of Moving Body", Publication No. 09304093, Publication Date Nov. 28, 1997, 1 page.
Patent Abstracts of Japan, Miguchi Ryosuke, "Navigation System", Publication No. 2000146607, Publication Date May 26, 2000, 1 page.
European Search Report for EP09153536 (corresponding European application of U.S. Appl. No. 11/133,591) dated Jun. 4, 2009.
Canadian Office Action.
Chinese Office action dated Apr. 13, 2010 for Appl. No. 2009101319757.
Chinese Office Action dated Apr. 13, 2011.
Canadian Office Action, dated on Sep. 22, 2008.

* cited by examiner

FIG. 3

| VECTOR DATA KIND (= ROAD) |
| --- |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| ABSOLUTE AZIMUTH OF NODE 1 |
| NODE NUMBER p2 |
| RELATIVE COORDINATE OF NODE 2 (x2) |
| RELATIVE COORDINATE OF NODE 2 (y2) |
| RELATIVE AZIMUTH OF NODE 2 |
| ⋮ |
| NODE NUMBER pn |
| RELATIVE COORDINATE OF NODE n (xn) |
| RELATIVE COORDINATE OF NODE n (yn) |
| RELATIVE AZIMUTH OF NODE n |

FIG. 7

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| Z DIRECTION ABSOLUTE COORDINATE OF NODE 1 (HEIGHT) |
| NODE NUMBER p2 |
| RELATIVE COORDINATE OF NODE 2 (x2) |
| RELATIVE COORDINATE OF NODE 2 (y2) |
| RELATIVE COORDINATE OF NODE 2 (z2) |
| ⋮ |
| NODE NUMBER pn |
| RELATIVE COORDINATE OF NODE n (xn) |
| RELATIVE COORDINATE OF NODE n (yn) |
| RELATIVE COORDINATE OF NODE n (zn) |

FIG. 8

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| HEIGHT DIRECTION GRADIENT OF NODE 1 |
| NODE NUMBER p2 |
| RELATIVE COORDINATE OF NODE 2 (x2) |
| RELATIVE COORDINATE OF NODE 2 (y2) |
| HEIGHT DIRECTION GRADIENT OF NODE 2 |
| ⋮ |
| NODE NUMBER pn |
| RELATIVE COORDINATE OF NODE n (xn) |
| RELATIVE COORDINATE OF NODE n (yn) |
| HEIGHT DIRECTION GRADIENT OF NODE n |

FIG. 10

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| NAME OF FUNCTION (F) BETWEEN NODE P1 - pm1 |
| VALUE OF PARAMETER 1 OF THE FUNCTION (VALUE OF h) |
| VALUE OF PARAMETER 2 OF THE FUNCTION (VALUE OF r1) |
| VALUE OF PARAMETER 3 OF THE FUNCTION (VALUE OF r2) |
| NODE NUMBER pm1 |
| RELATIVE COORDINATE OF NODE pm1 (x2) |
| RELATIVE COORDINATE OF NODE pm1 (y2) |
| ⋮ |
| NODE NUMBER pn |
| RELATIVE COORDINATE OF NODE n (xn) |
| RELATIVE COORDINATE OF NODE n (yn) |

EXPLANATORY VIEW OF DOUBLE-STREAKED LINE

ROAD 1: OTHER ROAD INFORMATION

ROAD 2: NODE SERIES PROVIDED BY MOVING ROAD 1 TO LEFT SIDE OF ALIGNMENT OF VECTOR SERIES BY FIXED LENGTH L

FIG. 14

| |
|---|
| SHAPE VECTOR SERIES IDENTIFYING NUMBER = 123 |
| REFERENCE VECTOR SERIES NUMBER = NONE |
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| ABSOLUTE AZIMUTH OF NODE 1 |
| NODE NUMBER p2 |
| RELATIVE COORDINATE OF NODE 2 (x2) |
| RELATIVE COORDINATE OF NODE 2 (y2) |
| RELATIVE AZIMUTH OF NODE 2 |
| ⋮ |
| NODE NUMBER pN |
| RELATIVE COORDINATE OF NODE N (xn) |
| RELATIVE COORDINATE OF NODE N (yn) |
| RELATIVE AZIMUTH OF NODE N |

WITH REGARD TO AZIMUTH, ABSOLUTE AZIMUTH OF DUE NORTH IS DEFINED AS 0 DEGREE AND ABSOLUTE AZIMUTH IS EXPRESSED BY 0 DEGREE THROUGH 360 DEGREES IN CLOCKWISE DIRECTION

FIG. 15

| |
|---|
| SHAPE VECTOR SERIES IDENTIFYING NUMBER = 124 |
| REFERENCE VECTOR SERIES NUMBER = 123 |
| OFFSET DISTANCE = 78m |
| OFFSET DIRECTION = LEFT |

DATA SERIES OF CENTER LINE SHAPE

⊘ : REPRODUCED SHAPE DATA SERIES

FIG. 21 (a)

NODE SERIES INFORMATION

| VECTOR DATA KIND (= ROAD) |
| --- |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| NODE NUMBER p2 |
| RELATIVE COORDINATE OF NODE 2 (x2) |
| RELATIVE COORDINATE OF NODE 2 (y2) |
| ⋮ |
| NODE NUMBER pn |
| RELATIVE COORDINATE OF NODE n (xn) |
| RELATIVE COORDINATE OF NODE n (yn) |

FIG. 21 (b)

ROAD ADDITIONAL INFORMATION

| ROAD KIND CODE |
| --- |
| ROAD NUMBER |
| TOLL ROAD CODE |
| NODE NUMBER p4 |
| CONNECTION LINK NUNBER l4 OF P4 |
| CONNECTION LINK ANGLE 1 OF P4 |
| ⋮ |
| CONNECTION LINK ANGLE l4 OF P4 |
| ⋮ |
| CONNECTION LINK NUMBER ln OF Pm |
| CONNECTION LINK ANGLE 1 OF Pm |
| ⋮ |
| CONNECTION LINK ANGLE ln OF Pm |

FIG. 21 (c)

EVENT INFORMATION

| | |
| --- | --- |
| EVENT CONTENT 1 (ACCIDENT) | |
| RELATIVE DISTANCE FROM NODE P4 | ← UTILIZE NODE P4 AS REFERENCE POINT |
| ⋮ | |
| EVENT CONTENT n (TRAFFIC JAM) | |
| RELATIVE POSITION FROM NODE Px (START END SIDE OF TRAFFIC JAM) | ← UTILIZE NODE Px AS REFERENCE POINT |
| RELATIVE POSITION FROM NODE Px (FINISH END SIDE OF TRAFFIC JAM) | ← |

FIG. 22 (a)

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| CORRESPONDING EVENT 1 |
| ⋮ |
| CORRESPONDING EVENT m1 |
| ⋮ |
| X DIRECTION RELATIVE COORDINATE OF NODE n |
| Y DIRECTION RELATIVE COORDINATE OF NODE n |
| CORRESPONDING EVENT 1 |
| ⋮ |
| CORRESPONDING EVENT mn |

FIG. 22 (b)

| |
|---|
| CORRESPONDING EVENT 1 |
| EVENT DETAILS |
| ⋮ |
| EVENT CONTENT m |
| DETAILS INFORMATION |

FIG. 23 (a)

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| NODE NUMBER p2 |
| RELATIVE COORDINATE OF NODE 2 (x2) |
| RELATIVE COORDINATE OF NODE 2 (y2) |
| ⋮ |
| NODE NUMBER pn |
| RELATIVE COORDINATE OF NODE n (xn) |
| RELATIVE COORDINATE OF NODE n (yn) |

FIG. 23 (b)

| |
|---|
| EVENT 1 (TRAFFIC ACCIDENT) |
| OCCURRENCE LOCATION NODE NUMBER |
| ⋮ |
| EVENT n (TRAFFIC JAM) |
| OCCURRENCE LOCATION NODE NUMBER SERIES 1 (START END SIDE OF TRAFFIC JAM) |
| ⋮ |
| OCCURRENCE LOCATION NODE NUMBER SERIES m (FINISH END SIDE OF TRAFFIC JAM) |

FIG. 25 (a)

| VECTOR DATA KIND (= ROAD) ||
|---|---|
| NODE TOTAL NUMBER ||
| FORWARD DIRECTION DEFINITION (= 2) | REARWARD DIRECTION DEFINITION (= 1) |
| NODE NUMBER p1 ||
| X DIRECTION ABSOLUTE COORDINATE OF NODE 1 (LONGITUDE) ||
| Y DIRECTION ABSOLUTE COORDINATE OF NODE 1 (LATITUDE) ||
| NODE NUMBER p2 ||
| RELATIVE COORDINATE OF NODE 2 (x2) ||
| RELATIVE COORDINATE OF NODE 2 (y2) ||
| ⋮ ||
| NODE NUMBER pn ||
| RELATIVE COORDINATE OF NODE n (xn) ||
| RELATIVE COORDINATE OF NODE n (yn) ||

FIG. 25 (b)

| ROAD KIND CODE |
|---|
| ROAD NUMBER |
| TOLL ROAD CODE |
| NODE NUMBER p4 |
| CONNECTION LINK NUNBER I4 OF P4 |
| CONNECTION LINK ANGLE 1 OF P4 |
| ⋮ |
| CONNECTION LINK ANGLE I4 OF P4 |
| ⋮ |
| CONNECTION LINK NUMBER In OF Pm |
| CONNECTION LINK ANGLE 1 OF Pm |
| ⋮ |
| CONNECTION LINK ANGLE In OF Pm |

FIG. 25 (c)

| EVENT 1 (= EVENT A) |
|---|
| EVENT DETAILS INFORMATION (TRAFFIC STOP, ETC.) |
| RELATIVE DISTANCE (= La) FROM NODE P4 |
| DETECTION IDENTIFYING FLAG (= 1) |
| EVENT 2 (EVENT B) |
| EVENT DETAILS INFORMATION (VEHICLE LANE REGULATION, ETC.) |
| RELATIVE DISTANCE (= La) FROM NODE P4 |
| DETECTION IDENTIFYING FLAG (= 2) |
| ⋮ |

FIG. 26

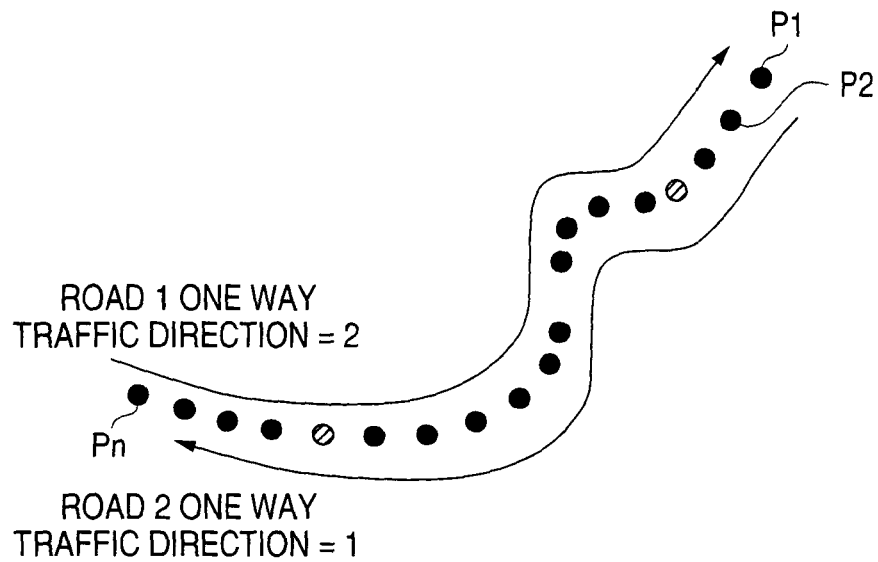

ROAD 1 ONE WAY TRAFFIC DIRECTION = 2

ROAD 2 ONE WAY TRAFFIC DIRECTION = 1

FIG. 27

| VECTOR DATA KIND (= ROAD) |
| --- |
| ONE WAY TRAFFIC DIRECTION (= 2) |
| NODE TOTAL NUMBER |
| NODE NUMBER p1 |
| X DIRECTION ABSOLUTE COORDINATE OF NODE 1 (LONGITUDE) |
| Y DIRECTION ABSOLUTE COORDINATE OF NODE 1 (LATITUDE) |
| NODE NUMBER p2 |
| RELATIVE COORDINATE OF NODE 2 (x2) |
| RELATIVE COORDINATE OF NODE 2 (y2) |
| ⋮ |
| NODE NUMBER pn |
| RELATIVE COORDINATE OF NODE n (xn) |
| RELATIVE COORDINATE OF NODE n (yn) |

FIG. 31 (a)

| |
|---|
| VECTOR DATA KIND (= ROAD) |
| NODE TOTAL NUMBER |
| NODE NUMBER p1 |
| X DIRECTION ABSOLUTE COORDINATE OF NODE 1 (LONGITUDE) |
| X DIRECTION ABSOLUTE COORDINATE OF NODE 1 (LATITUDE) |
| NODE NUMBER p2 |
| RELATIVE COORDINATE OF NODE 2 (x2) |
| RELATIVE COORDINATE OF NODE 2 (y2) |
| ⋮ |
| NODE NUMBER pn |
| RELATIVE COORDINATE OF NODE n (xn) |
| RELATIVE COORDINATE OF NODE n (yn) |

FIG. 31 (b)

| |
|---|
| ROAD KIND CODE |
| ROAD NUMBER |
| TOLL ROAD CODE |
| NODE NUMBER p4 |
| CONNECTION LINK NUNBER I4 OF P4 |
| CONNECTION LINK ANGLE 1 OF P4 |
| ⋮ |
| CONNECTION LINK ANGLE I4 OF P4 |
| ⋮ |
| CONNECTION LINK NUMBER In OF Pm |
| CONNECTION LINK ANGLE 1 OF Pm |
| ⋮ |
| CONNECTION LINK ANGLE In OF Pm |

FIG. 31 (c)

| |
|---|
| START END SIDE NUMBER (P4) |
| FINISH END SIDE NUMBER (Px) |
| NECESSARY TIME OF P4 → Px |

V: VECTOR SERIES
REPRESENTING FACILITY SHAPE

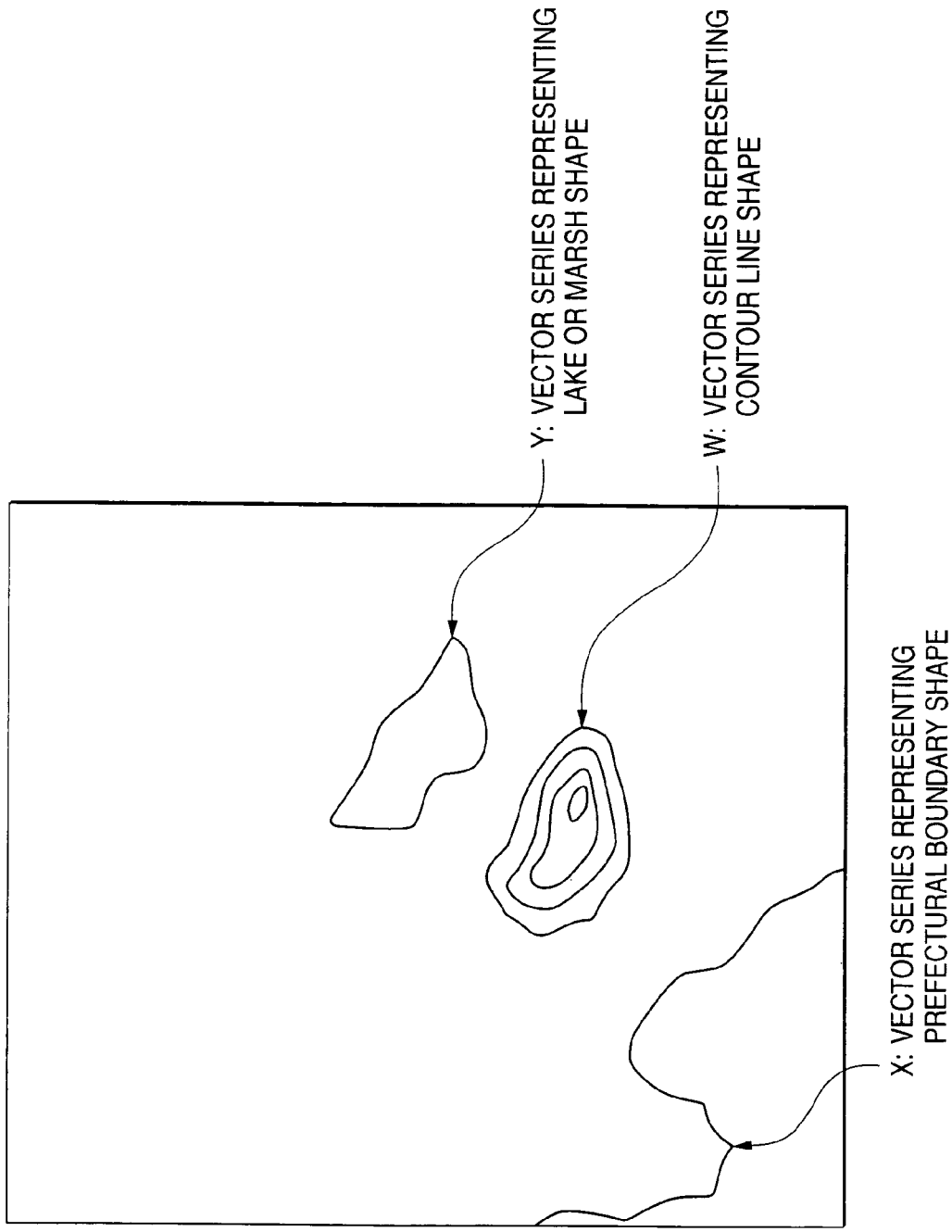

FIG. 36

| SHAPE VECTOR KIND = HOUSE |
|---|
| DETAILS INFORMATION |
| NODE TOTAL NUMBER |
| X DIRECTION ABSOLUTE COORDINATE OF NODE 1 (LONGITUDE) |
| Y DIRECTION ABSOLUTE COORDINATE OF NODE 1 (LATITUDE) |
| RELATIVE COORDINATE OF NODE 2 (x2) |
| RELATIVE COORDINATE OF NODE 2 (y2) |
| ⋮ |
| RELATIVE COORDINATE OF NODE n (xn) |
| RELATIVE COORDINATE OF NODE n (yn) |
| DISTANCE FROM HEAD OF CORESPONDING EVENT (START POSITION) |
| DISTANCE FROM HEAD OF CORRESPONDING EVENT (FINISH POSITION) |

FIG. 37

| SHAPE VECTOR KIND = WATER AREA |
|---|
| DETAILS KIND |
| NODE TOTAL NUMBER |
| X DIRECTION ABSOLUTE COORDINATE OF NODE 1 (LONGITUDE) |
| Y DIRECTION ABSOLUTE COORDINATE OF NODE 1 (LATITUDE) |
| RELATIVE COORDINATE OF NODE 2 (x2) |
| RELATIVE COORDINATE OF NODE 2 (y2) |
| ⋮ |
| RELATIVE COORDINATE OF NODE n (xn) |
| RELATIVE COORDINATE OF NODE n (yn) |
| DISTANCE FROM HEAD OF CORESPONDING EVENT (START POSITION) |
| DISTANCE FROM HEAD OF CORRESPONDING EVENT (FINISH POSITION) |

FIG. 38

| |
|---|
| SHAPE VECTOR KIND = ADMINISTRATIVE BOUNDARY |
| DETAILS KIND |
| NODE TOTAL NUMBER |
| X DIRECTION ABSOLUTE COORDINATE OF NODE 1 (LONGITUDE) |
| Y DIRECTION ABSOLUTE COORDINATE OF NODE 1 (LATITUDE) |
| RELATIVE COORDINATE OF NODE 2 (x2) |
| RELATIVE COORDINATE OF NODE 2 (y2) |
| ⋮ |
| RELATIVE COORDINATE OF NODE n (xn) |
| RELATIVE COORDINATE OF NODE n (yn) |
| DISTANCE FROM HEAD OF CORESPONDING EVENT (START POSITION) |
| DISTANCE FROM HEAD OF CORRESPONDING EVENT (FINISH POSITION) |

FIG. 39

| |
|---|
| SHAPE VECTOR KIND = CONTOUR LINE |
| DETAILS INFORMATION |
| NODE TOTAL NUMBER |
| X DIRECTION ABSOLUTE COORDINATE OF NODE 1 (LONGITUDE) |
| Y DIRECTION ABSOLUTE COORDINATE OF NODE 1 (LATITUDE) |
| RELATIVE COORDINATE OF NODE 2 (x2) |
| RELATIVE COORDINATE OF NODE 2 (y2) |
| ⋮ |
| RELATIVE COORDINATE OF NODE n (xn) |
| RELATIVE COORDINATE OF NODE n (yn) |
| DISTANCE FROM HEAD OF CORESPONDING EVENT (START POSITION) |
| DISTANCE FROM HEAD OF CORRESPONDING EVENT (FINISH POSITION) |

PRIOR ART

FIG. 50 (a)

| | SHAPE DATA ID NUMBER = 123 | |
|---|---|---|
| | VECTOR DATA KIND (= ROAD) | |
| | NODE TOTAL NUMBER (N) | |
| | NODE NUMBER p1 | |
| | X DIRECTION ABSOLUTE COORDINATE OF NODE p1 (LONGITUDE) | |
| | Y DIRECTION ABSOLUTE COORDINATE OF NODE p1 (LATITUDE) | |
| | INTERCEPT DIRECTION ABSOLUTE AZIMUTH OF NODE p1 | |
| | NUMBER OF SHAPE INTERPOLATION POINT BETWEEN p1 → p2 (a) | |
| INTERPOLATION POINT #1 | AZIMUTH DIFFERENCE FROM p1 ABSOLUTE AZIMUTH | DISTANCE FROM p1 |
| INTERPOLATION POINT #2 | AZIMUTH DIFFERENCE FROM #1 → #2 STRAIGHT LINE | DISTANCE FROM #1 |
| | ⋮ | |
| INTERPOLATION POINT #3 | AZIMUTH DIFFERENCE FROM #a-1 → #a STRAIGHT LINE | DISTANCE FROM #a-1 |
| | NODE NUMBER p2 | |
| | NUMBER OF SHAPE INTERPOLATION POINT BETWEEN p2 → p3 (b) | |
| | ⋮ | |
| | NODE NUMBER pN | |

FIG. 50 (b)

| |
|---|
| SHAPE VECTOR SERIES ID NUMBER = 123 |
| VECTOR NODE KIND (= ROAD) |
| NODE TOTAL NUMBER |
| NODE NUMBER p1 |
| X DIRECTION ABSOLUTE COORDINATE OF NODE p1 (LONGITUDE) |
| Y DIRECTION ABSOLUTE COORDINATE OF NODE p1 (LATITUDE) |
| ABSOLUTE AZIMUTH OF NODE p1 (p1 → p2 AZIMUTH) |
| NODE NUMBER p2 |
| DISTANCE OF p1 → p2 (m) |
| RELATIVE AZIMUTH OF NODE p2 (p2 → p3 AZIMUTH) |
| NODE NUMBER p3 |
| DISTANCE OF p2 → p3 (m) |
| RELATIVE AZIMUTH OF NODE p3 (p3 → p4 AZIMUTH) |
| ⋮ |
| NODE NUMBER pN |

FIG. 50 (c)

| |
|---|
| EVENT NUMBER 1 (TRAFFIC ACCIDENT, ETC.) |
| RELATED REGULATION INFORMATION (1 VEHICLE LANE REGULATION, ETC.) |
| OCCURRENCE LOCATION REFERENCE POINT NODE NUMBER (= p1, ETC.) |
| DIRECTION FLAG (= FORWARD DIRECTION TO NODE SERIES) |
| RELATIVE DISTANCE FROM REFERENCE POINT (m) |
| ⋮ |
| EVENT NUMBER (TRAFFIC JAM, ETC.) |
| AVERAGE SPEED IN TRAFFIC JAM (15km, ETC.) |
| OCCURRENCE POSITION REFERENCE POSITION NODE NUMBER (pj =, ETC.) |
| DIRECTION FLAG (= REARWARD DIRECTION TO NODE SERIES) |
| RELATIVE DISTANCE FROM REFERENCE POINT (START END SIDE) (m) |
| RELATIVE DISTANCE FROM REFERENCE POINT (START END SIDE) (m) |

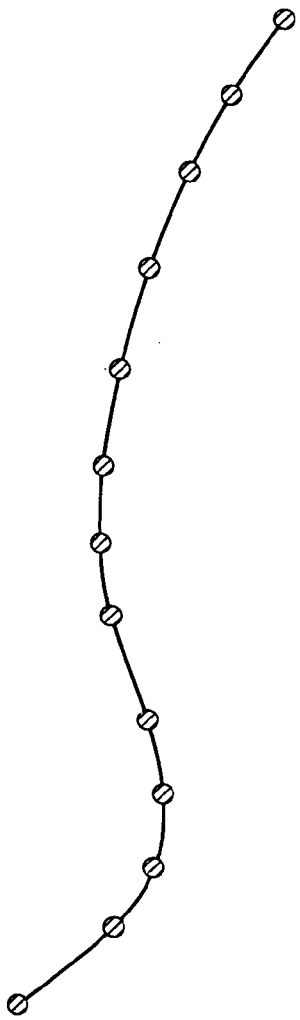
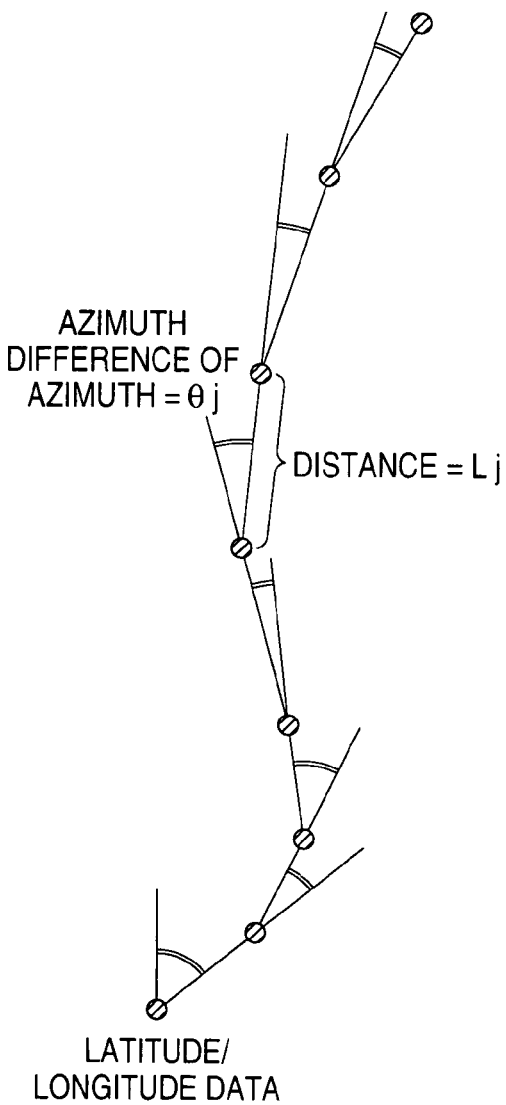
FIG. 51 (a)
ORIGINAL MAP DATA
ON TRANSMITTING SIDE
FIG. 51 (b)
TRANSMITTED/RECEIVED COORDINATE
SERIES OF SHAPE VECTOR DATA
AZIMUTH
DIFFERENCE OF
AZIMUTH = θj
DISTANCE = Lj
LATITUDE/
LONGITUDE DATA

METHOD FOR TRANSMITTING INFORMATION ON POSITION ON DIGITAL MAP AND DEVICE USED FOR THE SAME

CROSS-REFERENCES TO RELATED APPLICATIONS

This application is a divisional of U.S. patent application Ser. No. 10/169,644, U.S. Pat. No. 6,931,319, filed on Sep. 23, 2002.

TECHNICAL FIELD

The present invention relates to a method of transmitting position information of a digital map and an apparatus utilized for the method, particularly, enabling to transmit a position on a digital map efficiently and precisely.

BACKGROUND ART

In recent years, vehicles mounted with navigation vehicle-mounted apparatus have rapidly been increased. The navigation vehicle-mounted apparatus holds a data base of a digital map and displays traffic jam or position of traffic accident on a map based on traffic jam information or traffic accident information provided from a traffic information center or the like, further, executes search for route by adding these information to conditions therefor.

Although the database of the digital map is formed by several companies in Japan, due to a difference in basic drawings and digitizing technology, the map data includes error and the error differs by the digital maps of the respective companies.

In the case of transmitting, for example, a position of traffic accident by traffic information or the like, when longitude and latitude data of the position is provided by itself, according to the vehicle-mounted apparatus, there is a concern that a position on a different road is identified as the position of the traffic accident depending on kinds of the data base of the digital map held.

In order to improve such inaccuracy of information transmission, conventionally, a node number is defined at a node such as a crossroads present in a road network, further, a link number is defined for a link representing a road between nodes, according to the digital map data base of the respective companies, respective crossroads and roads are stored in correspondence with node numbers and link numbers, further, in traffic information, a road is specified by a link number and a spot on the road is displayed by an expression method stating some meters from a head thereof.

However, a node number or a link number defined in a road network, needs to switch to a new number in accordance with newly laying or changing roads, further, when a node number or a link number is changed, the digital map data of the respective companies must be updated. Therefore, according to a system of transmitting position information of a digital map by using a node number or a link number, enormous social cost is required for maintenance thereof.

In order to improve such a point, the inventors of the invention have proposed, in Japanese Patent Application No. 214068/1999, a system in which in order to transmit a road position, an information providing side transmits "road shape data" comprising coordinate series indicating a road shape of a road section having a predetermined length including the road position and "relative position data" indicating the road position in the road section represented by the road shape data and a side of receiving the information specifies the road section on a digital map by executing map matching by using the road shape data and specifies the road position in the road section by using the relative position data, further, the inventors have proposed, in Japanese Patent Application No. 242166/1999, a system of also transmitting "additional information" such as kind of road, road number, a number of crossing links of nodes, angles of crossing links, name of crossroads and so on in a road section such that map matching on the receiving side can accurately be executed even when a transmission data amount of the "road shape data" is reduced, further, proposed a system of thinning the transmission data amount of the "road shape data" within a range by which erroneous matching on the receiving side is not brought about.

In this case, the map matching on the receiving side is carried out, for example, as follows.

As shown by FIG. 45, when as "road shape data" representing a road shape of a road bringing about traffic jam in section A through B, longitude and latitude data of spots $P_0$ $(x_0, y_0), P_1 (x_1, y_1), \ldots, P_k (x_k, y_k)$ are transmitted as follows, $(x_0, y_0) (x_1, y_1) \ldots (x_k, y_k)$, as shown by FIG. 44, the receiving side selects roads included in a range of error centering on spot $P_0 (x_0, y_0)$ by using map data read from a digital map data base of its own as candidates and narrows down candidates therefrom by using transmitted "additional information". When a single candidate is narrowed down, positions most proximate to $(x_0, y_0)$ and $(x_k, y_k)$ of the road are calculated and the section is defined as a road section represented by "road shape data".

When the single candidate is not narrowed down and roads Q and R remain as candidates, positions $Q_0$ and $R_0$ on the respective candidate roads most proximate to $P_0 (x_0, y_0)$ are calculated and distances between $P_0$ through $Q_0$ and $P_0$ through $R_0$ are calculated. The operation is executed for respective points $P_1 (x_1, y_1) \ldots, P_k (x_k, y_k)$ A road section minimizing a value produced by adding square means of the distances from respective points $P_0, P_1, \ldots, P_k$ is calculated and the road section is specified by a method of determining the road section as a road section represented by the "road shape data".

The traffic jam section of A through B is specified based on the transmitted "relative position data" with a position of starting the road section calculated from the "road shape data" as onset.

When position information on a digital map is transmitted by traffic information or the like, it is necessary to transmit data such that a correct position can be recognized by a counterpart in a short period of time.

Further, as a case of transmitting position information on a digital map, there is assumed a case of transmitting information of a disaster site in mountains or accident at rivers and therefore, it is also necessary to transmit a map shape of other than roads or position information of a spot other than roads.

The invention responds to such problems and it is an object thereof to provide a method of transmitting position information of a digital map for further improving a method of transmitting position information of a digital map by using "shape data" specifying a map shape on the digital map and "relative position data" specifying a relative position in the map shape specified by the "shape data", capable of transmitting a position on the digital map efficiently and accurately, further, capable of transmitting also position information other than a road shape of a spot on a road, further, provide an apparatus used therefor.

DISCLOSURE OF INVENTION

Hence, according to the invention, there is provided a method of transmitting position information in which transmitting side transmits position information including coordinate series information for specifying a vector shape on a digital map and a receiving side executes map matching by the coordinate series information to thereby identify the vector shape on the digital map wherein the coordinate series information is transmitted by adding intercept azimuth information of a coordinate point included in the coordinate series information thereto.

Further, the coordinate series information is transmitted by adding information of a height of a coordinate point included in the coordinate series information thereto.

Further, the coordinate series information includes position information of a coordinate point and information of a function approximating the vector information passing through the coordinate point.

Further, the coordinate series information is constituted by information designating coordinate series information of a reference and information prescribing a distance and a direction of offset with regard to the coordinate series information of the reference.

Further, a coordinate value of a digital map representing the vector shape is included in the coordinate series information by making the coordinate value transit in a range by which erroneous matching is not produced.

Further, relative distance information from a reference point set at a middle of the vector shape is included in the position information.

Further, event information made to directly correspond to a coordinate point of the coordinate series information is included in the position information.

Further, a direction identifying flag is included in the position information and a vehicle advancing direction influenced by an event produced at a road is clearly indicated by the direction identifying flag.

Further, a direction identifying flag is included in the coordinate series information and a situation of one way traffic regulation of a road specified by the coordinate series information is clearly indicated by the direction identifying flag.

Further, a plurality of reference points are set in the road shape and information of travel time between the reference points is included in the position information.

Further, a vector shape of other than a road is specified by the coordinate series information.

Further, the transmitting side transmits the position information by including coordinate series information and reference point relative position information for specifying one or more of reference points and relative position information of a target position with respect to the reference points thereto and the receiving side identifies the vector shape on the digital map by executing the match mapping by the coordinate series information, specifies positions of the reference points in the vector shape by using the reference point relative position information and specifies the target position by using the relative position information of the target position with respect to the reference points.

Further, the receiving side restores coordinate series information of coordinate points at equal intervals from the coordinate series information and executes map matching by using the restored coordinate series information.

Further, there is constituted an apparatus of restoring a coordinate series for restoring coordinate series information of coordinate points at equal intervals from coordinate series information subjected to data compression for specifying a vector shape on a digital map.

According to the method of transmitting position information of a digital map of the invention, the position on the digital map can efficiently and accurately be transmitted.

By transmitting the coordinate series information by adding intercept azimuth information, height information, one way traffic information by a direction identifying flag or the like, accuracy of matching can be promoted and necessary time for matching can be shortened.

By approximating the vector shape by a function or displaying shape data of an up and down way separating road by an offset distance, a data amount can be reduced and a data transmission efficiency can be promoted.

By setting a reference point at a crossroads or the like in a road section and displaying a relative distance to an event position or describing the event position by a node number, accuracy of specifying the event position on the receiving side can be promoted.

Further, by using the direction identifying flag, a vehicle advancing direction influenced by an event can be specified.

Further, data can be transmitted by modifying the data in the form of transmitting travel time.

Further, the invention is applicable also to transmission of vector data of other than a road, further, a position outside of a road on the digital map can also be transmitted.

Further, the method and the apparatus for restoring data at equal intervals from a compressed shape data series, can promote a matching efficiency on the receiving side.

BRIEF DESCRIPTION OF THE DRAWINGS

FIG. 3 is a diagram showing node series information according to First Embodiment, FIG. 7 is a diagram showing node series information according to Second Embodiment, FIG. 8 is a diagram showing node series information adopting other expressing method according to Second Embodiment, FIG. 10 is a diagram showing node series information according to Third Embodiment, FIG. 14 is a diagram showing node series information on a master side according to Fourth Embodiment, FIG. 15 is a diagram showing node series information on a side of referring to the master according to Fourth Embodiment, FIGS. 21(a), 21(b), and 21(c) are diagrams showing node series information, road additional information, and event information according to Sixth Embodiment, FIGS. 22(a) and 22(b) are diagrams showing node series information and event details information according to Seventh Embodiment, FIGS. 23(a) and 23(b) are diagrams showing node series information and event information according to Seventh Embodiment, FIG. 25(a), 25(b), and 25(c) are diagrams showing node series information, road additional information and event information according to Eighth Embodiment, FIG. 26 is a view for explaining a one way traffic situation according to Eighth Embodiment, FIG. 27 is a diagram showing node series information representing one way traffic according to Eighth Embodiment, FIGS. 31(a), 31(b), and 31(c) are diagrams showing node series information, road additional information, and necessary time information according to the ninth Embodiment, FIG. 35 is a diagram showing vectors representing a prefectural boundary shape, contour lines, and a lake or marsh shape in a digital map, FIG. 36 is a diagram showing node series information of a house shape according to Eleventh Embodiment, FIG. 37 is a diagram showing node series information of a water area shape according to Eleventh Embodiment, FIG. 38 is a diagram showing node series information of an administrative boundary shape according to Eleventh Embodiment, FIG. 39 is a diagram showing node series information of a contour line shape according to Eleventh Embodiment, FIGS. 50(a), 50(b), and 50(c) are diagrams showing node series information representing coordinates of a node by a distance and an argument between the node and a preceding node, FIGS. 51(a) and 51(b) are views schematically showing shape data representing coordinates of a node by a distance and an argument between the node and a preceding node.

Figure 1:
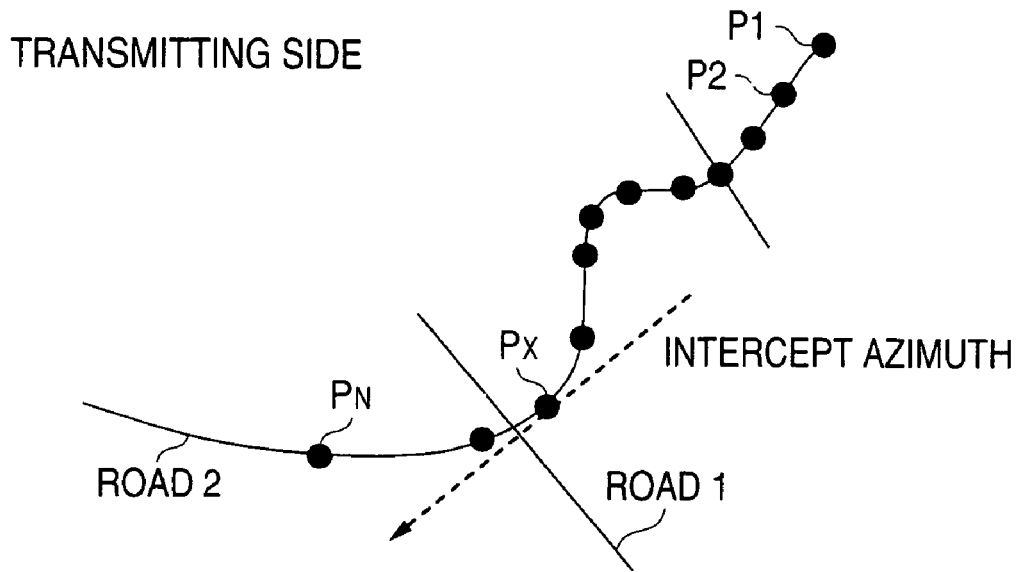
FIG. 1 is a view for explaining shape data of First Embodiment.

The numerals in the drawings are 10, 20 position information transmitting/receiving apparatus, 11, 22 position information receiving portion, 12 node series restoring portion, 13 map matching portion, 14 digital map data base, 15 digital map displaying portion, 16 event information inputting portion, 17 position information converting portion, and 18, 21 position information transmitting portion.

DETAILED DESCRIPTION OF THE PREFERRED EMBODIMENTS

First Embodiment

In First Embodiment, an explanation will be given of a method of transmitting position information for promoting accuracy of map matching for specifying a road section on a receiving side by transmitting shape data by adding intercept azimuth information thereto.

An explanation will be given of an example of a case of transmitting longitude data and latitude data of respective spots indicated by black circles as shape data in order to transmit a road shape from $P_1$ to $P_N$ of a road 2 shown in FIG. 1. Here, the black circles represent nodes and interpolation points of nodes on the roads included in a digital map database. A node is set in correspondence with a crossroads, an inlet or an outlet of a tunnel, an inlet or an outlet of a bridge, a boundary of administrative sections or the like and is attached with a node number. An interpolation point is a point set for reproducing a road shape between nodes. In this case, a node and an interpolation point are inclusively referred to as nodes so far as not particularly specified otherwise.

Although longitude data and latitude data of respective nodes are stored in digital map databases on a transmitting side and a receiving side, as mentioned above, data respectively include error.

The transmitting side transmits shape data indicating road shape by including longitude and latitude data of $P_1, P_2, \ldots, P_N$, in order to reduce a data amount, longitude and latitude data of $P_1$ is displayed by absolute coordinate values (longitude, latitude) and longitude and latitude data of $P_2, \ldots, P_N$ are displayed by relative coordinate values indicating differences from the longitude and latitude data of $P_1$, or differences from longitude and latitude data of a preceding node.

As shown by a dotted line arrow mark of FIG. 1, intercept azimuth information included in the shape data is information of azimuth of an intercept at a position of the respective node, that is, azimuth of a tangential line in contact with a road curve at node $p_X$.

Figure 46:
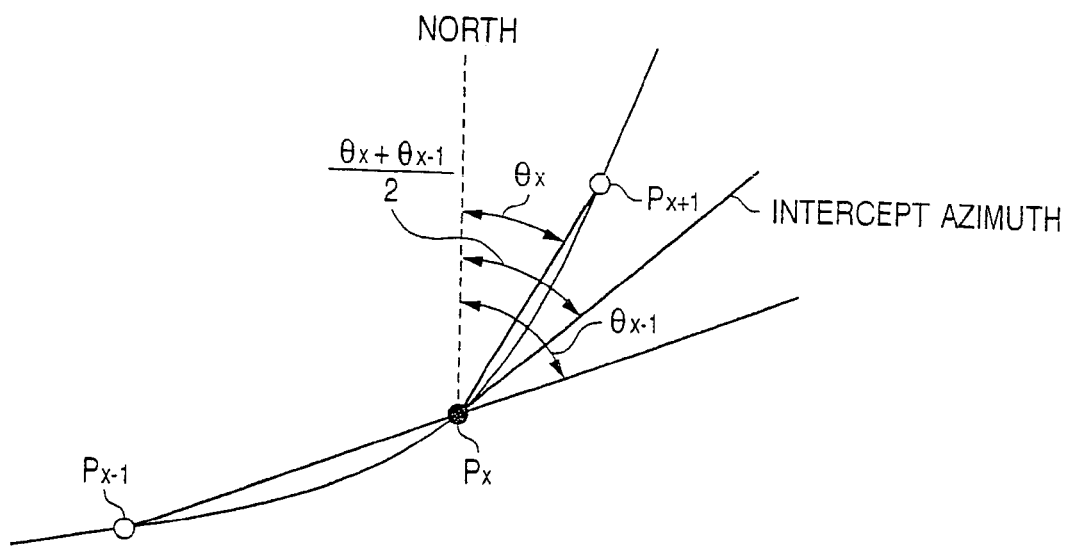
FIG. 46 is a view for explaining a intercept azimuth.

As shown by FIG. 46, the intercept azimuth at the node position is displayed in a range of 0 degree through 360 degrees in the clockwise direction by defining an absolute azimuth of due north as 0 degree. The intercept azimuth of the node $P_X$ can be calculated as follows when a contiguous node disposed on the upstream side of the node $p_X$ is defined as $p_{X-1}$ and a contiguous node disposed on the downstream side of the node $p_X$ is defined as $p_{X+1}$, by averaging an azimuth $\theta_{X-1}$ of a straight line connecting node $p_{X-1}$ and node $p_X$ and an azimuth $\theta_X$ of a straight line connecting node $P_X$ and $p_{X+1}$.

$$(\theta_{X-1}+\theta_X)/2$$

Figure 2:
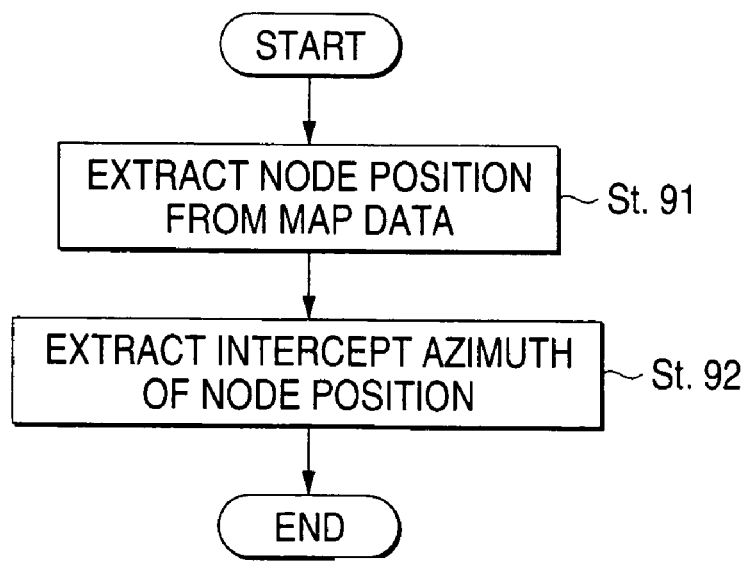
FIG. 2 is a flowchart showing a procedure of forming shape data on a transmitting side according to First Embodiment.

FIG. 2 shows a procedure of calculating an intercept azimuth of respective node on a transmitting side as follows.

Step 91: Sample respective node position from map data,

Step 92: Sample intercept azimuth of respective node position.

Intercept azimuths of respective nodes sampled in this way are summarized as node series information representing shape data along with longitude and latitude data of respective nodes as shown by FIG. 3. The node series information is aligned with kinds of vector data represented by node series (in this case, "road"), a total number of nodes (N pieces) and longitude and latitude data and intercept azimuth data with regard to respective nodes starting from node No. $P_1$. Although longitude and latitude data and intercept azimuth data of node No. $P_1$ are displayed by absolute coordinates and an absolute azimuth, longitude and latitude data and intercept azimuth data of from node No. $P_2$ through node No. $P_N$, are displayed by relative coordinates and relative azimuths in order to reduce a data amount.

The node series information is converted into a transmission format along with relative position data representing positions of events in the road section represented by the node series information and is transmitted.

Figure 5:
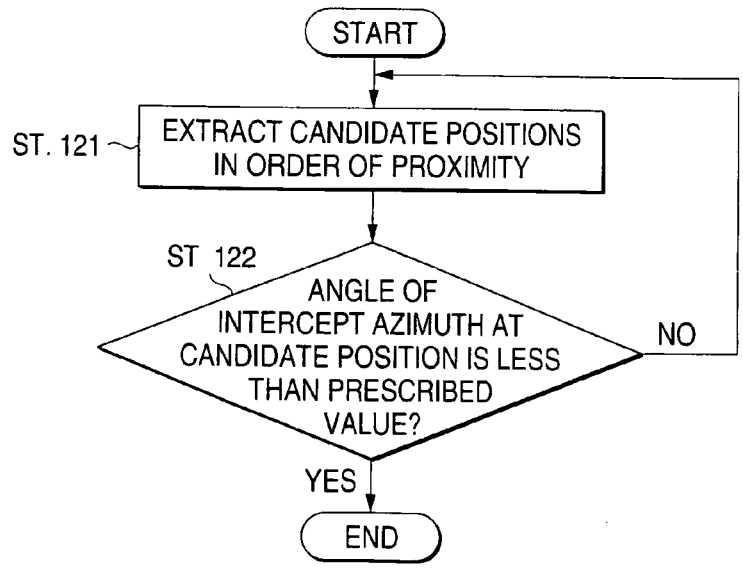
FIG. 5 is a flowchart showing a map matching procedure on the receiving side according to First Embodiment.

The receiving side receiving the node series information and relative position data executes map matching and specifies the road section represented by the node series information. FIG. 5 shows a procedure in map matching.

Figure 44:
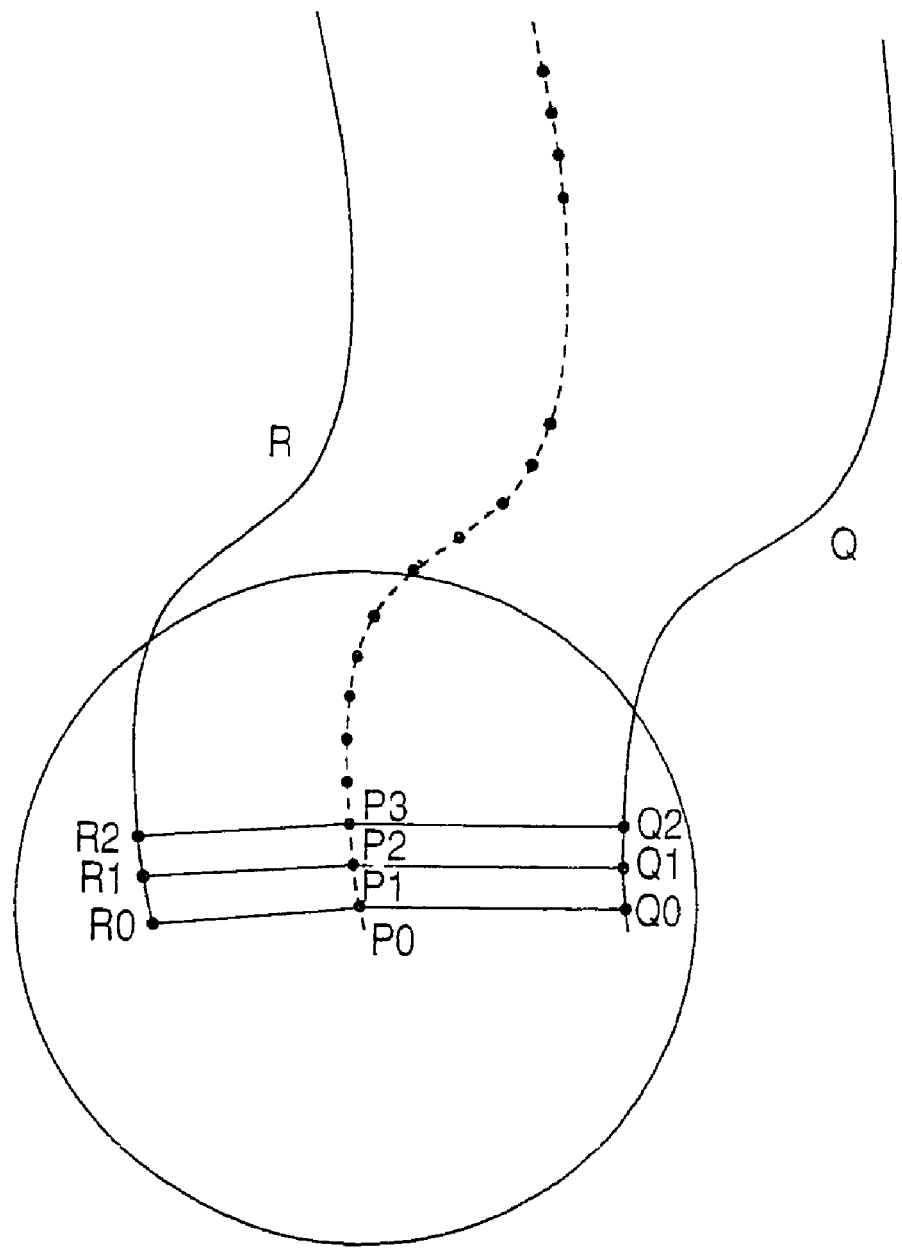
FIG. 44 is a view for explaining an example of map matching.
Figure 45:
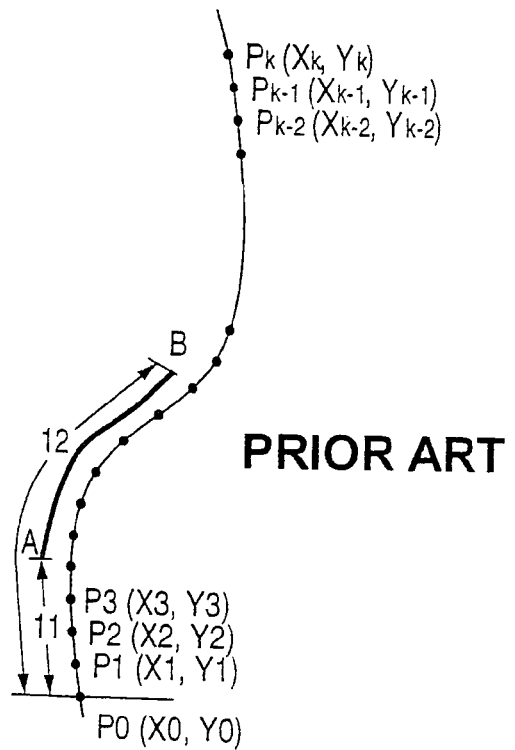
FIG. 45 is a view for explaining road shape data and relative position information.

Step 121: Sample a position on the road proximate to the longitude and latitude data of node No. $P_X$ as a matching candidate in an order of proximity, Step 122: Calculate a difference between a section azimuth of the candidate position and a section azimuth of $P_X$. When the difference is smaller than a prescribed value, the matching candidate is constituted to thereby constitute an object of map matching explained in reference to FIG. 44.

Further, when the difference is larger than the prescribed value, the candidate is excluded from the matching candidate, the operation returns to step 121, samples a next proximate one as a matching candidate and executes the procedure of step 122.

Figure 4:
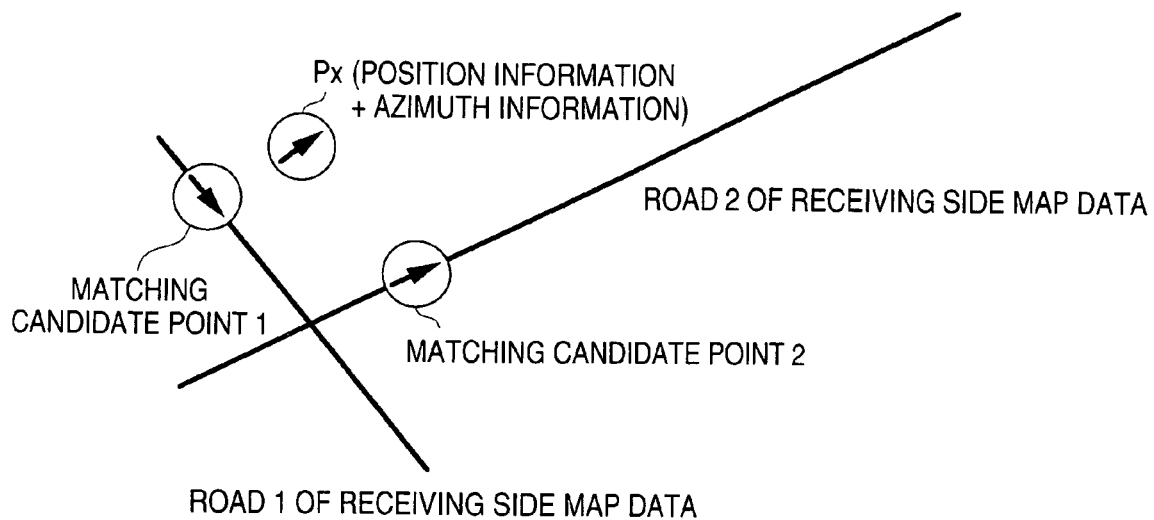
FIG. 4 is a view for explaining map matching on a receiving side according to First Embodiment.

Although in FIG. 1, spot $P_X$ on road 2 is liable to be erroneously matched to road 1 constituting the most proximate road, as shown by FIG. 4, on the receiving side, in matching, by comparing intercept azimuths of matching candidate point 1 on road 1 most proximate to spot $P_X$ and spot $P_X$, matching candidate point 1 can be excluded from the candidate and matching candidate 2 on road 2 next proximate to spot $P_X$ can remain as the candidate.

In this way, according to the method of transmitting position information of the embodiment, by including the intercept azimuth information to the position information, matching accuracy on the receiving side is promoted and the candidate can be narrowed down in a short period of time. Therefore, on the receiving side, the transmitted position on the digital map can accurately and swiftly be recognized.

Further, although according to the embodiment, an explanation has been given of the case of including coordinates data of nodes and interpolation points of a road to shape data indicating road shape, coordinate points may be resampled at constant intervals on the road shape and the shape data indicating the road shape may include coordinate data of the coordinate points.

Second Embodiment

In Second Embodiment, an explanation will be given of a method of transmitting position information for transmitting shape data by adding data of height.

Figure 6:
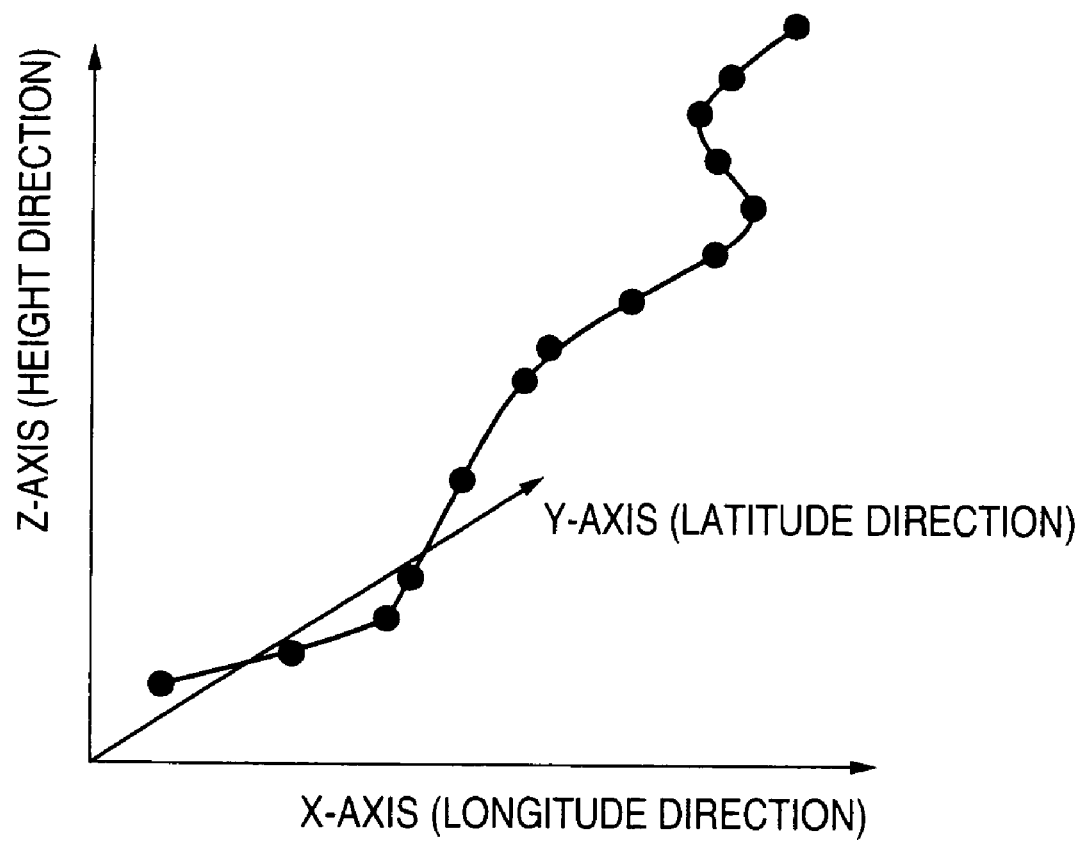
FIG. 6 is a view for explaining shape data of Second Embodiment.

FIG. 6 schematically shows vector data series representing a road in the case of representing digital map data in three dimensions of longitude, latitude and height.

In this case, the transmitting side transmits node series information of shape data by including X direction coordinate (longitude), Y direction coordinate (latitude) and Z direction coordinate (altitude) of respective node as shown by FIG. 7.

On the receiving side, similar to the intercept azimuth information of First Embodiment, in matching, candidate points can be narrowed down by referring to Z direction coordinate of matching candidate points selected based on distances on X-Y plane and transmitted positions on the digital map can accurately and swiftly be recognized.

Further, although Z direction coordinate of respective node is represented by altitude, the Z direction coordinate may be displayed by a height from the surface of the ground. By including data of the height from the ground surface to the shape data in this way, a high level road can be discriminated from a general road passing therebelow.

Further, as shown by FIG. 8, the Z direction coordinate of respective node may be displayed by a slope between the node and a preceding node.

Third Embodiment

According to Third Embodiment, an explanation will be given of a method of transmitting position information for reducing a transmitted data amount by approximating shape data by a function.

Figure 9:
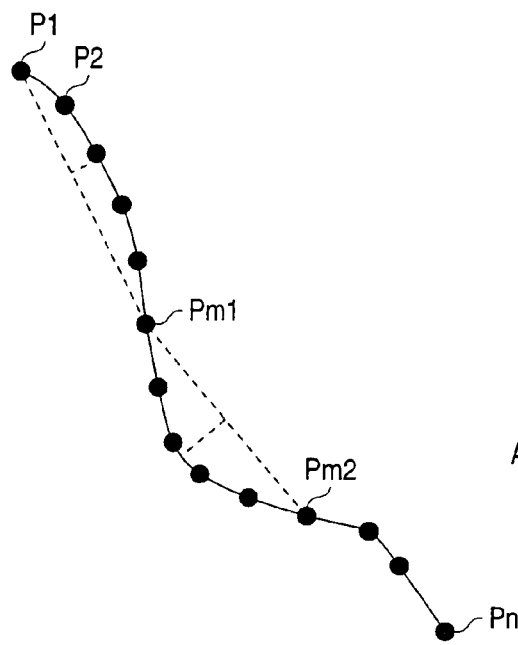
FIGS. 9(a), 9(b), and 9(c) illustrate views indicating a reduction in data according to Third Embodiment.
Figure 9:
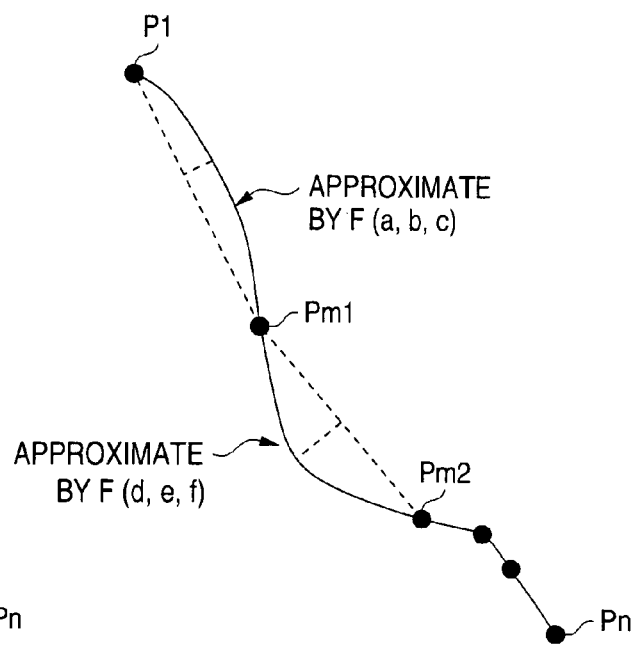
Figure 9:
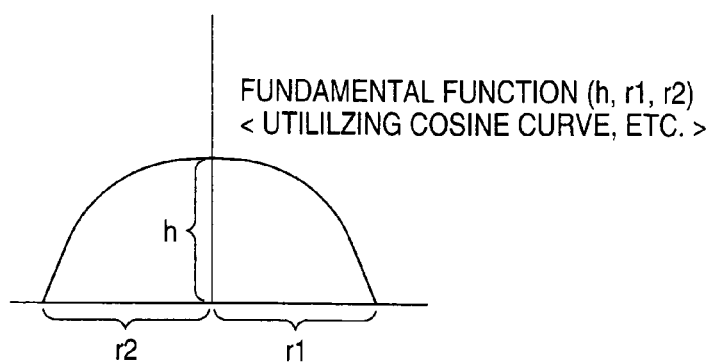

In a vector data series from $P_1$ to $P_n$ shown in FIG. 9(*a*), shapes from $P_1$ through $P_{m1}$ and $P_{m1}$ through $P_{m2}$, are approximated by a basic function F (h, $r_1$, $r_2$) such as a cosine curve shown in FIG. 9(*c*). Notations h, $r_1$, and $r_2$ designate parameters of the function.

By executing the approximation, as shown by FIG. 9(*b*), $P_1$ through $P_{m2}$ can be represented by coordinates data of $P_1$, $P_{m1}$ and $P_{m2}$, a function approximating an interval of $P_1$ through $P_{m1}$, indicated by F (a, b, c) and parameters thereof and a function approximating an interval of $P_{m1}$, through $P_{m2}$ indicated by F (d, e, f) and parameters thereof to thereby enable to reduce the data amount.

FIG. 10 shows node series information in this case.

On the receiving side, when the shape data is received, between $P_1$ and $P_{m2}$, there is calculated a shape represented by F (a, b, c) and F (d, e, f) from coordinates data of $P_1$, $P_{m1}$ and $P_{m2}$ and parameters thereof and map matching is executed by setting spots at arbitrary intervals on the shape.

In this case, the shape represented by F (a, b, c) and F (d, e, f) may not coincide accurately with the shapes from $P_1$ through $P_{m1}$ and $P_{m1}$ through $P_{m2}$ of FIG. 9(a) but may be approximated thereto to a degree of not causing erroneous matching on the receiving side.

According to the method of transmitting position information of the embodiment, the transmitted data amount can considerably be reduced and efficient formation of data transmission can be achieved.

Fourth Embodiment

In Fourth Embodiment, an explanation will be given of a method of transmitting position information for transmitting road shape data of parallel roads by a small data amount.

Figure 11:
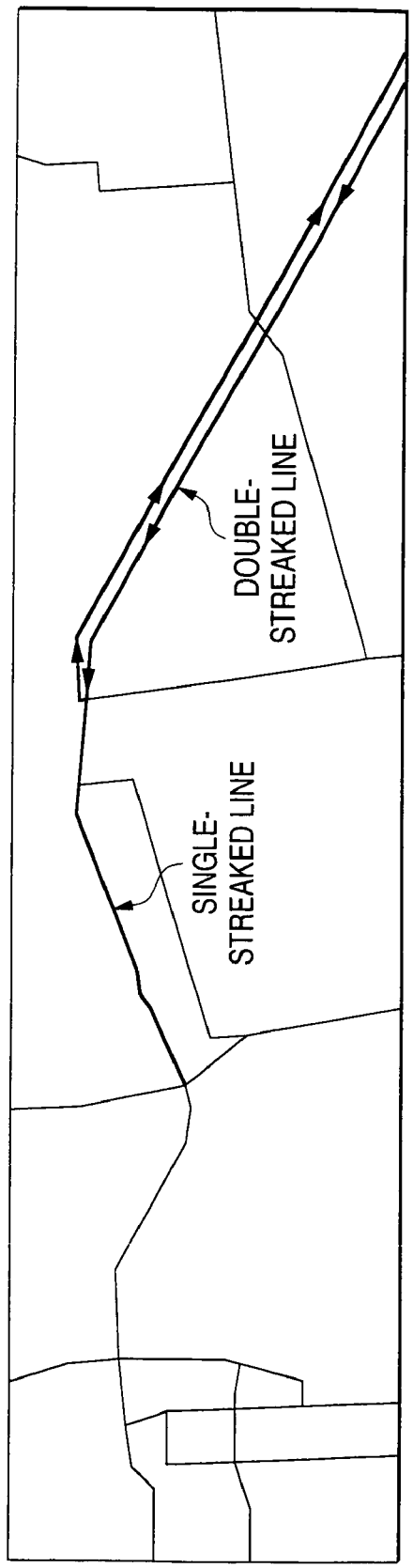
FIG. 11 is an explanatory view of a double-streaked line.
Figure 12:
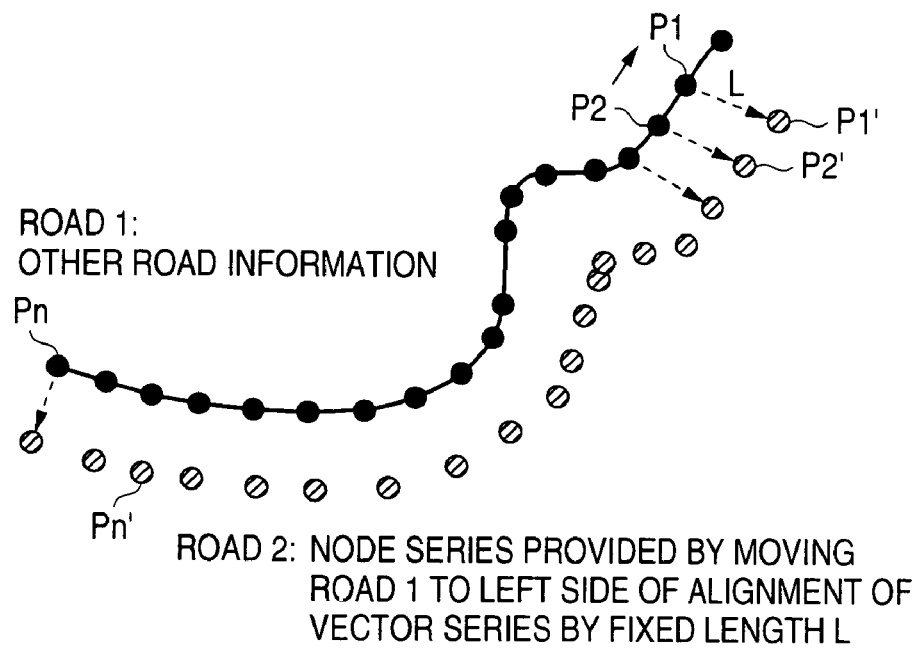
FIG. 12 is a view for explaining shape data according to Fourth Embodiment.

As shown by FIG. 11, an express way or a toll road is expressed by a road separating up and down ways in a number of digital maps and is referred to as double-streaked line. In the case of the double-streaked line, as shown by FIG. 12, road shape data of one road (road 2) utilizes road shape data of other road (road 1) to thereby enable to compress a data amount.

Figure 13:
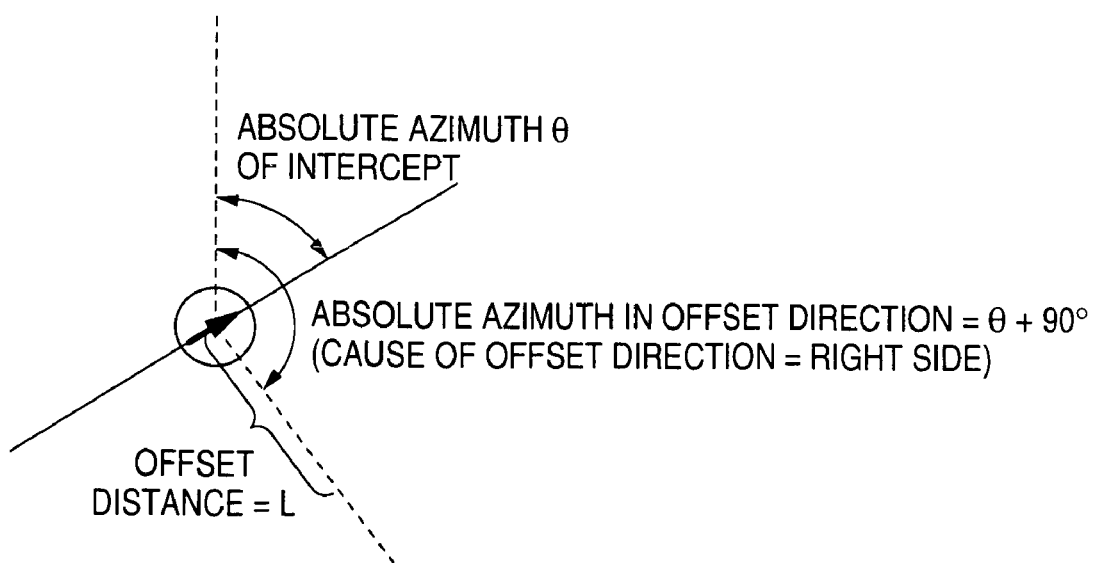
FIG. 13 is a view explaining a direction of offset according to Fourth Embodiment.

In this case, node spots $P_1'$, $P_2'$, ..., $P_n'$ of road 2 can be approximated as spots produced by moving road spots $P_1$, $P_2$, ..., $P_n$ in road 1 to a right side (or left side) of road 1 by a constant offset distance (L). As shown by FIG. 13, a direction of offset is a direction orthogonal to a intercept direction of each of the node spots $P_1$, $P_2$, ..., $P_n$ of road 1.

As shown by FIG. 14, in node series information, there are described a shape vector series identifying number constituting an identifying number of shape data at top thereof and a reference vector series number representing shape data to be referred. In node series information of road 1 constituting a master, the reference vector series number becomes "none" and there are described longitude and latitude data and intercept azimuth data for respective nodes similar to the first embodiment (FIG. 3).

Meanwhile, as shown by FIG. 15, node series information of road 2 referring to the shape data of road 1 describes a shape vector series identifying number of road 2, a reference vector series number representing the shape data of road 1 of the reference, an offset distance and an offset direction (right or left of node series constituting master).

In this way, in the case of parallel roads, by utilizing road shape data of one road, shape data of other thereof is expressed to thereby enable to reduce considerably a data amount to be transmitted.

Figure 16:
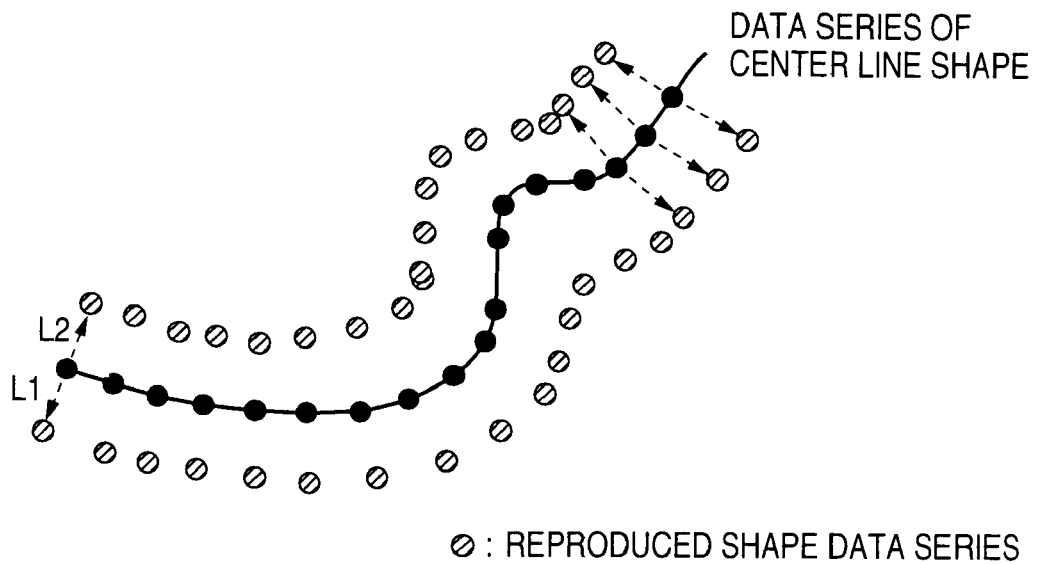
FIG. 16 is a view for explaining shape data by other system according to Fourth Embodiment.

Further, although according to the system, other road is mapped and reproduced by offsetting one existing road shape of a double-streaked line by a constant distance, in this case, there is a drawback that error is increased at an abrupt curve portion having a large radius of curvature. In order to reduce error of a reproduced position as small as possible by mapping, as shown by FIG. 16, there may be constructed a constitution in which a center line of the double-streaked line is calculated, the nonexisting "assumed center line shape vector data series" is transmitted as a master, both of shape data of an up route and down route refer to the master and are prescribed only by the offset distance and the offset direction.

Further, although an explanation has been given here of a double-streaked line, the system of the embodiment is also applicable by constituting an object by roads in a lattice shape in which the number of roads run in parallel.

Fifth Embodiment

In Fifth Embodiment, an explanation will be given of a method of transmitting position information for modifying and transmitting shape data.

According to the method of transmitting position information of the embodiment, original map shape is more or less deformed to a degree of not causing erroneous matching on the receiving side and transmitted.

Figure 17:
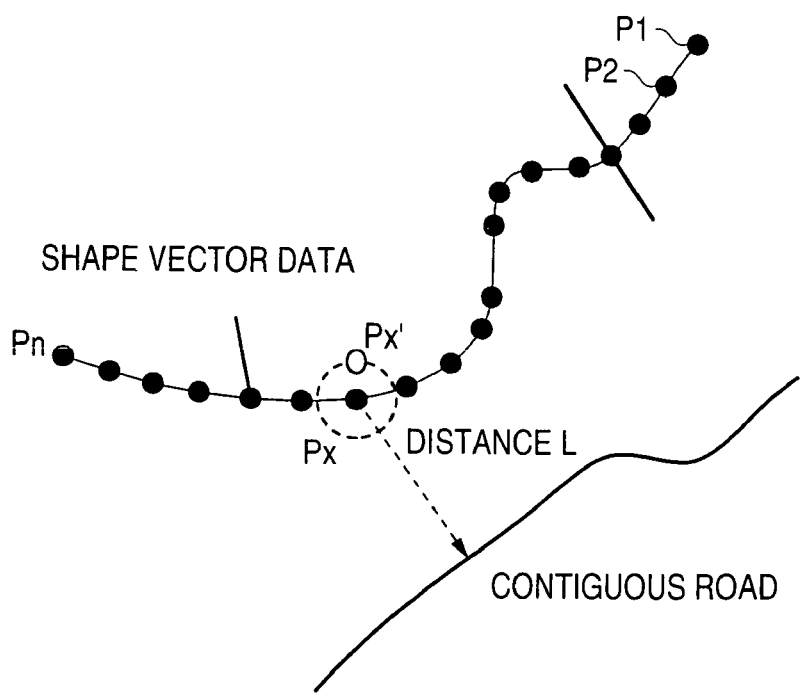
FIG. 17 is a view for explaining shape data according to Fifth Embodiment.

FIG. 17 schematically shows deformation of shape data in this case. When an original position provided to map data is defined as $P_X$, the position is modified to a position of $P_X'$. At this occasion, a distance (transition value B) from $P_X$ to $P_X'$ is set based on a distance L from spot $P_X$ to a contiguous road, further, an azimuth (transition azimuth θ) $P_X$ to $P_X'$ is determined by a random number.

Figure 18:
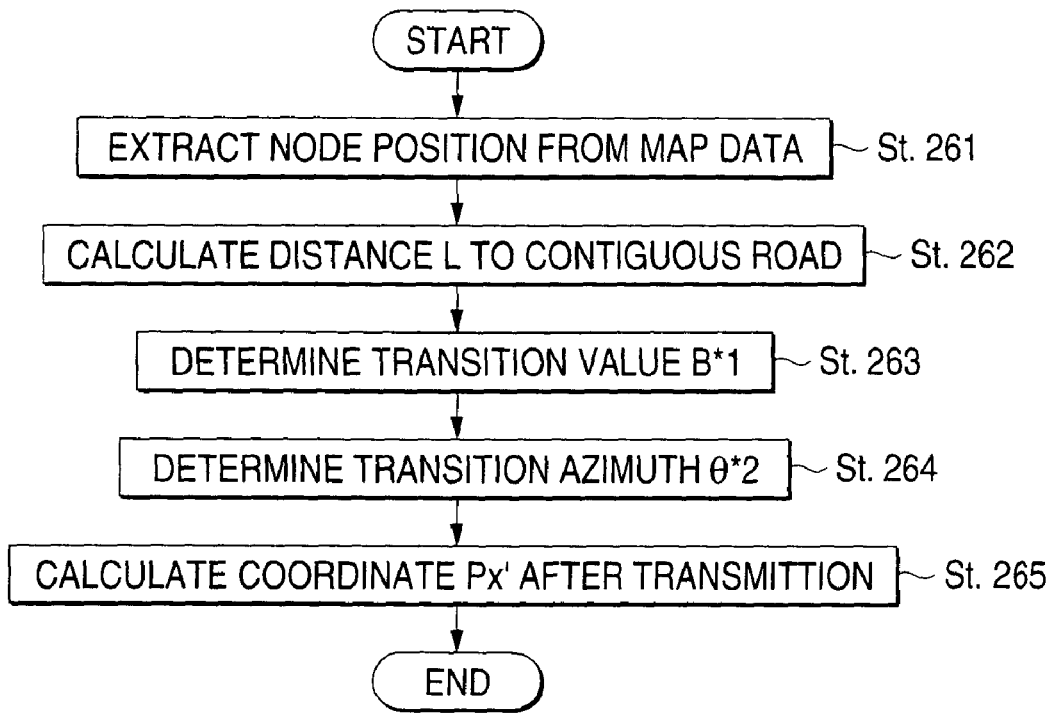
FIG. 18 is a flowchart showing a procedure of forming shape data according to Fifth Embodiment.

FIG. 18 shows a procedure of calculating $P_X'$.
Step 261: Sample node position $P_X$ from map data,
Step 262: Calculate distance L to contiguous road,
Step 263: Determine transition value B.

Figure 19:
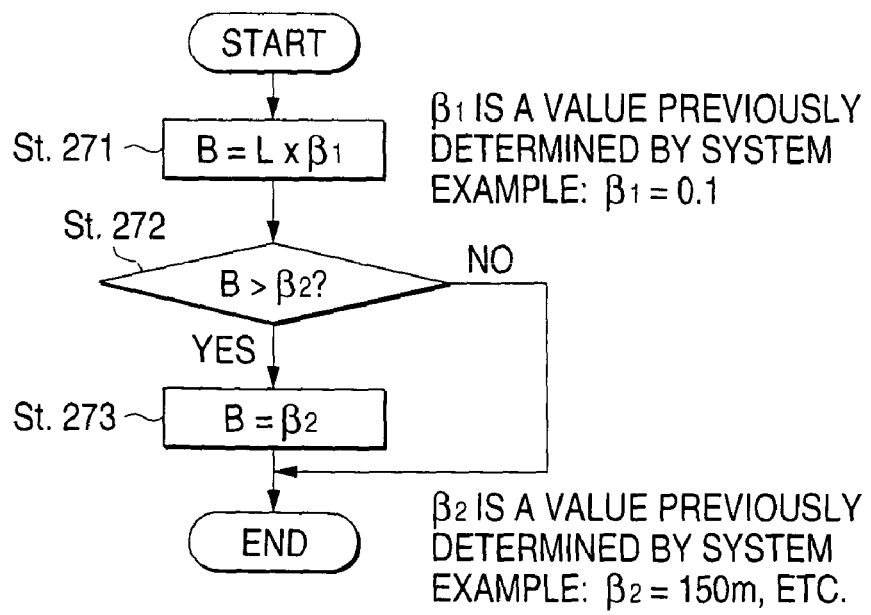
FIG. 19 is a flowchart showing a procedure of determining a transition value according to Fifth Embodiment.

In determining the transition value B, by a procedure shown in FIG. 19, step 271: Calculate B by $B=L \times \beta_1$. Here, $\beta_1$ is a value less than 1 previously determined by the system (for example, $\beta_1=0.1$).

Step 272: Compare B calculated at the step 271 with $\beta_2$. $\beta_2$ is a distance previously determined by the system (for example, $\beta_2=150$ m). When $B > \beta_2$, Step 273: Determine B as $B=\beta_2$.

Further, in step 272, when $B \square \beta_2$, the value calculated at step 271 is determined as B.

When the transition value B is determined in this way,
step 264: Determine transition azimuth θ by the following equation.

$$\theta = R \times 360 \text{ (degree)}$$

Here, notation R designates a random number generating function and is a uniform random number of 0 through 1. Further, notation θ represents an absolute azimuth of 0 degree through 360 degrees in the clockwise direction by defining an absolute azimuth of due north by 0 degree.

Step 265: Calculate coordinates $P_X'$ after transition by using the determined transition value B and transition azimuth θ.

By such procedure, the map data can be deformed to a degree of not causing erroneous matching on the receiving side.

Further, as a method of deforming map data, otherwise, there can also be used a method of calculating the coordinate $P_X'$ after transition by adding a random number C in the latitude direction and adding a random number D in the longitude direction to the coordinate value of $P_X$, or a method of determining a transition value from an original position to constitute a normal distribution of $\sigma=A$.

Sixth Embodiment

In Sixth Embodiment, an explanation will be given of a method of transmitting position information for specifying a relative position in a road section specified by shape data by using a reference point pertinently defined in the road section and transmitting the information.

Figure 20:
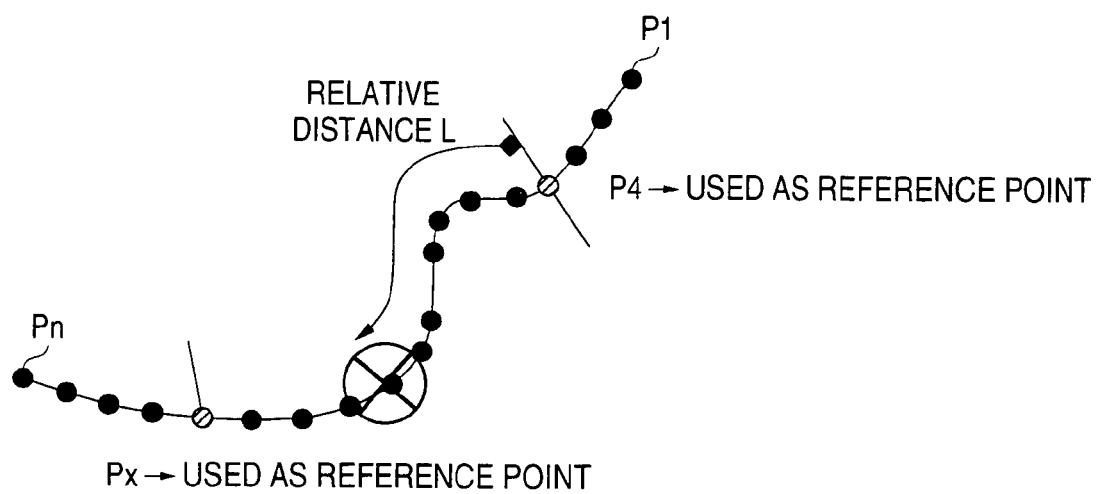
FIG. 20 is a view for explaining a reference point according to Sixth Embodiment.

As shown by FIG. 20, when a node series from $P_1$ through $P_n$ is transmitted by shape data and transmitting a position of traffic accident therein, according to a method of the embodiment, a node $P_4$ of a crossroads in the midst of a node series is defined as a reference point and the position of traffic accident is displayed by a relative distance from $P_4$.

Further, traffic jam caused in the road section is displayed by a relative distance from a node $P_X$ of a T-road as a reference point.

Relative position information displayed by using the reference point defined in the road section in this way, is transmitted to the receiving side by data shown in FIGS. 21(a), 21(b), and 21(c).

FIG. 21(a) is node series information specifying the road section. FIG. 21(b) is road additional information proposed by Japanese Patent Application No. 242166/1999 displaying a node number linked to the node series information, a number of connection links of crossroads and connection link angles of the respective connection links with respect to crossroads nodes included in the road section for respective crossroads nodes along with a road kind code, a road number and a toll road code of the road constituting an object.

FIG. 21(c) shows event information for displaying a relative position in the road section and event content of event occurring at the position and the relative position is displayed by a relative distance from a reference point indicated clearly.

By defining a node easy to identify such as a crossroads in a road section as a reference point by the transmitting side, the receiving side can precisely grasp a position at which an event occurs.

Seventh Embodiment

In Seventh Embodiment, an explanation will be given of a method of transmitting position information for directly correlating respective node information and an event occurring at a corresponding node and displaying and transmitting these.

According to the method, as shown by FIG. 22(a), in node series information, successive to coordinate data of respective node numbers, a corresponding event occurring at a corresponding node is described by a corresponding event code and as shown by FIG. 12(b), event content represented by the respective corresponding event code is described as event details information.

Or, as shown by FIG. 23(a), in the node series information, only a code number and coordinate data are described, and as shown by FIG. 23(b), as event information, event content and a node number at which event occurs are described.

According to the method, the event occurring position can be reproduced with high accuracy.

Eighth Embodiment

In Eighth Embodiment, an explanation will be given of a method of transmitting position information for transmitting position information on a road by including information on a road including information in a direction of advancing a vehicle.

For example, there is a case in which traffic accident on a road influences only running at an up road and does not influence running at a down road. In such occasion, according to traffic information, it is necessary to transmit information of a position at which traffic accident occurs and a road influenced by the traffic accident.

Figure 24:
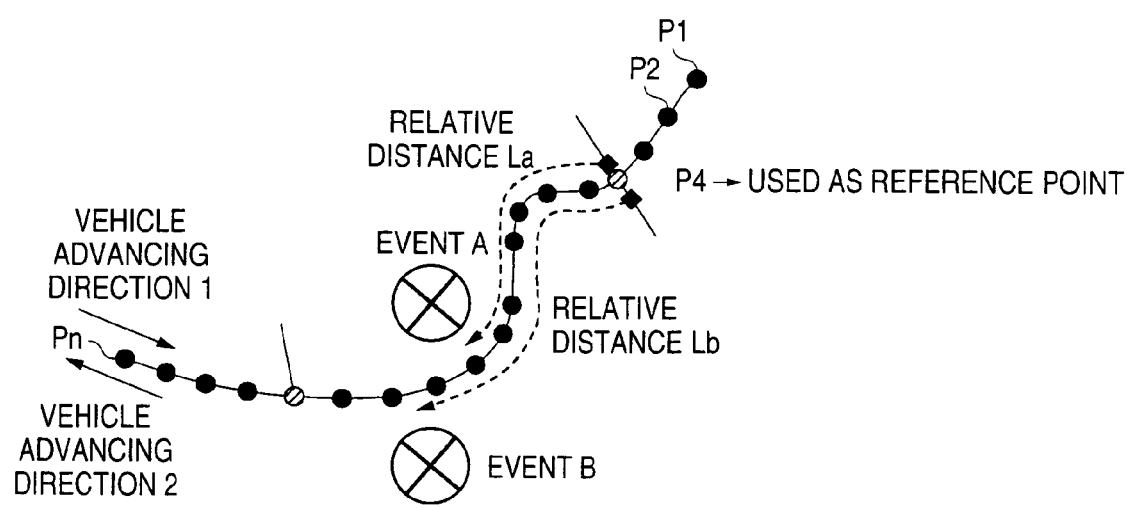
FIG. 24 is a view for explaining an event occurring situation according to Eighth Embodiment.

FIG. 24 schematically shows a state in which an event A (traffic stop) influencing a vehicle running in a direction of a vehicle advancing direction 1 on a road and an event B (traffic lain regulation) influencing a vehicle running in a direction of a vehicle advancing direction 2, occur.

At this occasion, position information on the road is transmitted to the receiving side by data shown in FIGS. 25(a), 25(b), and 25(c).

FIG. 25(a) shows node series information specifying a road section. According to the node series information, there is prescribed a definition of direction in which a forward direction with respect to an order of aligning node series is defined as 2 and a rearward direction with respect to the order of aligning the node series is defined as 1. FIG. 25(b) is road addition information similar to that in Sixth Embodiment (FIGS. 21(a), 21(b), and 21(c)).

FIG. 25(c) shows event information displaying an event content, a relative distance from a reference point as well as a vehicle advancing direction influenced by the event by a direction identifying flag indicating the definition of direction with regard to respective event. That is, a vehicle running in a direction of a vehicle advancing direction 1 is influenced by an event A and therefore, 1 defining a rearward direction is displayed at the direction identifying flag and a vehicle running in a direction of a vehicle advancing direction 2 is influenced by an event B and therefore, the direction identifying flag is displayed with 2 defining a forward direction.

On the receiving side receiving the data, the road section can be specified by map matching with regard to an alignment in one direction of nodes $P_1, P_2, \ldots, P_n$ displayed by the node series information and an event occurring position in the road section including the vehicle advancing direction can be specified based on relative information and the direction identifying flag described in the event information. Therefore, events in two directions can be expressed by map data in one direction and a data amount can be compressed.

Figure 29:
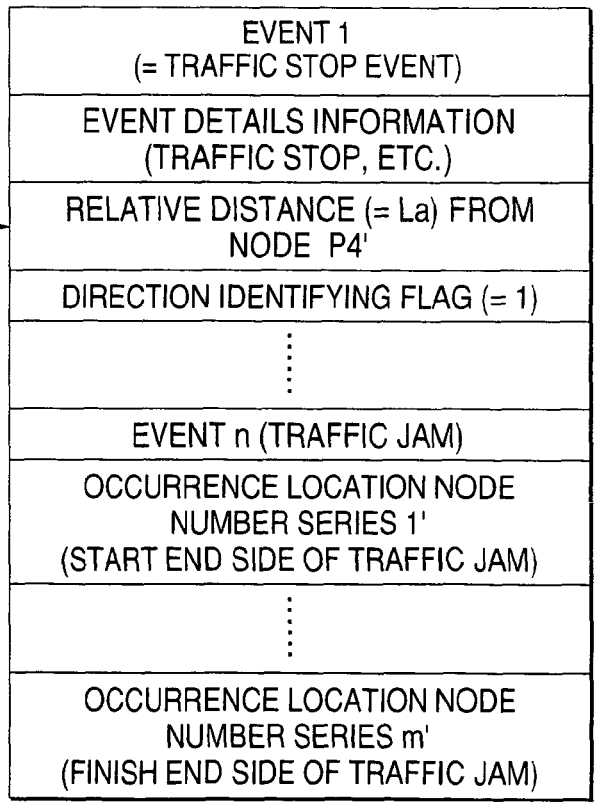
FIG. 29 is a diagram showing event information representing an event of a double-streaked line according to Eighth Embodiment.

Further, the direction identifying flag can also be used in the case of describing an event occurring at one road of a double-streaked line explained in the fourth embodiment and as shown by FIG. 29, the fact that the event is an event which occurs at the road (FIG. 15) of the shape vector series identifying number 124 reproduced by mapping the road (FIG. 14) of the shape vector series identifying number 123, can be displayed by the direction identifying flag (=1). Further, event information at the road is displayed by using a node number ($P_n$') after mapping as a node number.

Further, the direction identifying flag can also be used in the case of displaying one way traffic of a road section specified by shape data and as shown by FIG. 26, in the case in which directions are defined such that a forward direction is defined as 1 and a rearward direction is defined as 2 with regard to an order of aligning a node series, when a road section specified by shape data constitutes one way traffic in $P_n \rightarrow P_1$ direction, as shown by FIG. 27, one way traffic information can be displayed by describing a direction identifying flag designating the one way traffic direction as 2 in the node series information. Further, the case of not constituting one way traffic is displayed by 0, (=not one way traffic).

Figure 28:
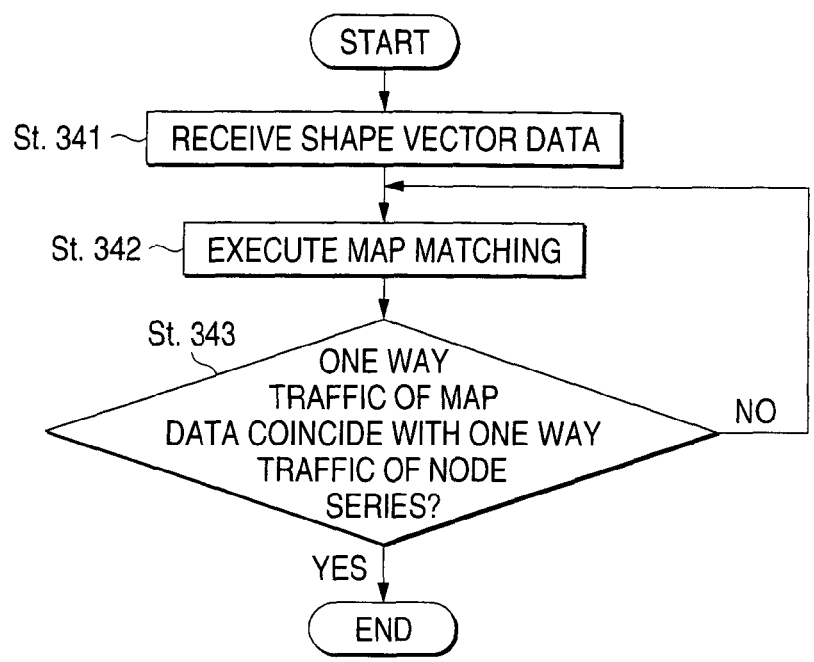
FIG. 28 is a flowchart showing a map matching procedure according to Eighth Embodiment.

On the receiving side receiving the node series information, in matching, as shown by FIG. 28, step 341: Receive node series information, step 342: Execute map matching and sample road spot of matching candidate.

Step 343: Designate one way traffic of the candidate spot on map data and compare the designated one way traffic with one way traffic direction information of node series. When these coincide with each other, the matching candidate is made to remain and when these do not coincide with each other, the candidate is excluded from the matching candidate, the operation returns step 342 and samples a successive matching candidate.

In this way, by using the direction identifying flag, information of one way traffic, information of a vehicle advancing direction influenced by an event which occurs can be transmitted by a small data amount.

Ninth Embodiment

In Ninth Embodiment, an explanation will be given of a method of transferring position information transmitting travel time between two spots as traffic information.

Figure 30:
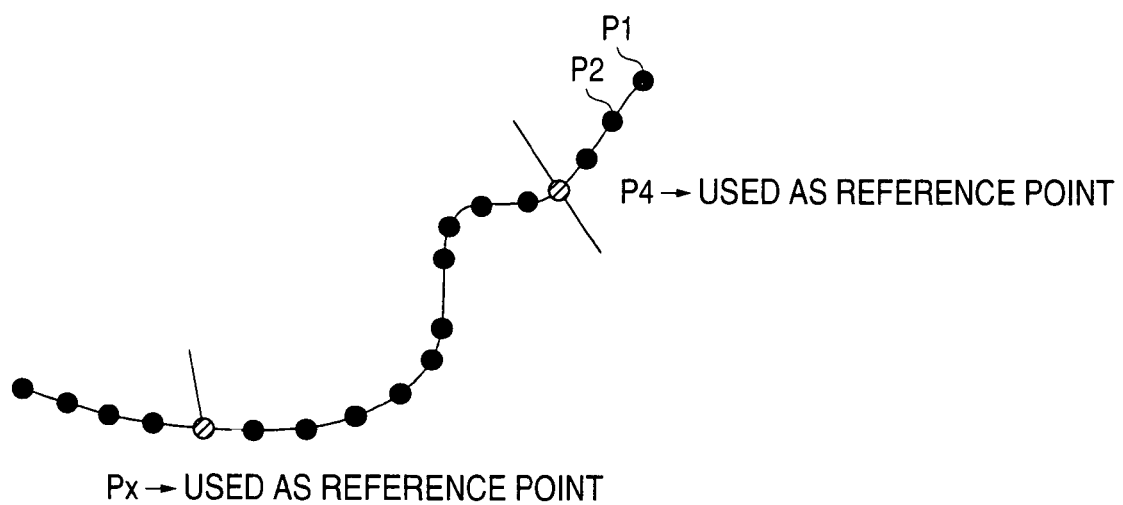
FIG. 30 is a view for explaining travel time according to a ninth embodiment.

According to the method, as shown by FIG. 30, two reference points ($P_4$, $P_X$) are set and travel time between the reference points is transmitted by data shown in FIGS. 31(*a*), 31(*b*), and 31(*c*).

FIG. 31(*a*) shows node series information for specifying a traffic section including the two reference points. FIG. 31(*b*) shows road additional information similar to that of FIG. 21(*b*) explained in Sixth Embodiment. FIG. 31(*c*) shows necessary time information displaying travel time, describing a start end side node number ($P_4$), a finish end side road number ($P_X$) and travel time therebetween.

On the receiving side receiving the information, by using the node series information and the road additional information, the road section can be specified by map matching and the travel time between the reference points can be recognized from the necessary time information.

Tenth Embodiment

In Tenth Embodiment, an explanation will be given of a method of reproducing vector data series by which map matching is easy to execute on a receiving side receiving position information subjected to data compression.

Figure 32:
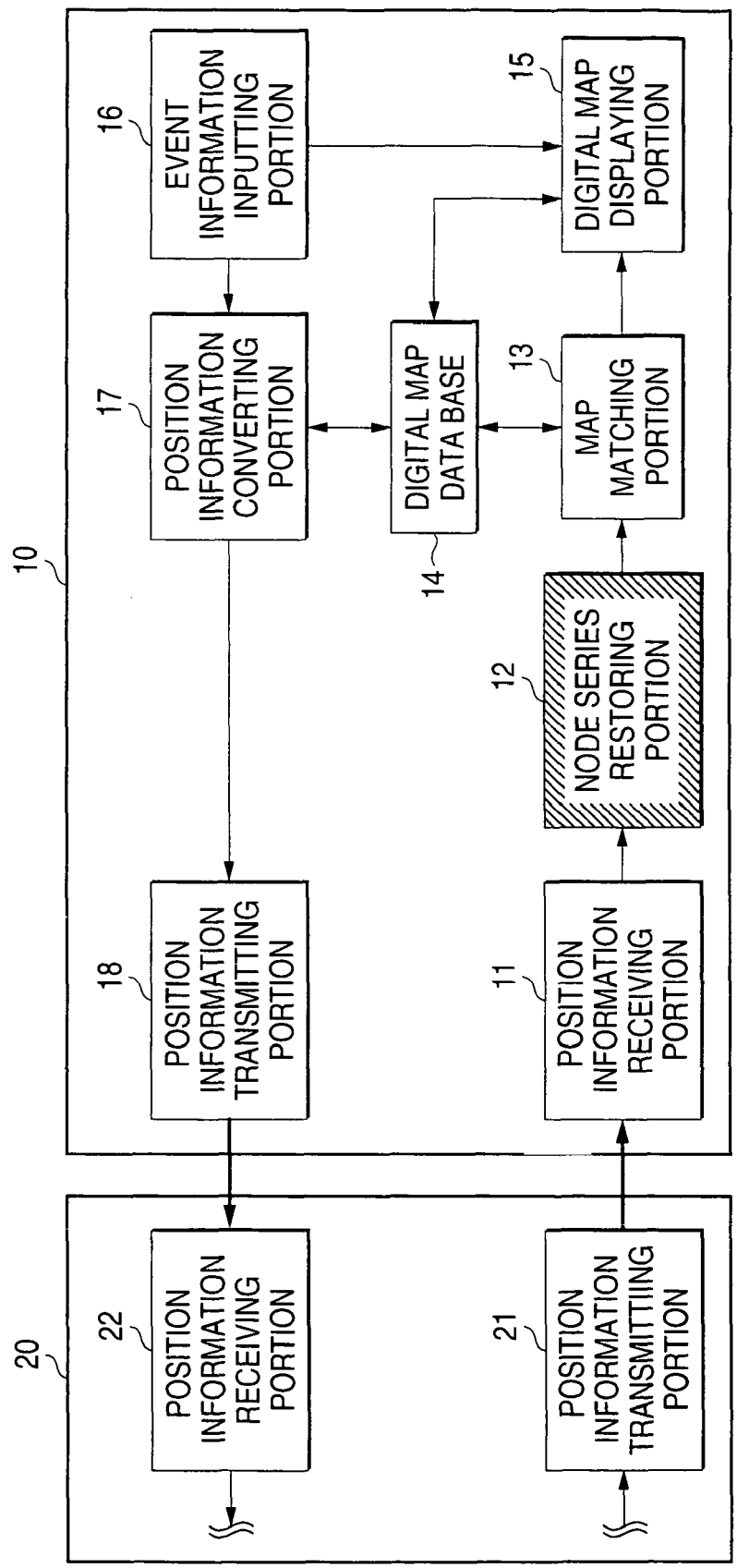
FIG. 32 is a block diagram showing a constitution of a position information transmitting/receiving apparatus according to Tenth Embodiment.

FIG. 32 shows a position information transmitting/receiving apparatus 10 receiving and reproducing position information, further, generating and transmitting position information informing event occurrence.

The apparatus 10 is provided with a position information receiving portion 11 for receiving position information transmitted from a position information transmitting portion 21 of other apparatus 20, a node series restoring portion 12 for converting shape data included in the position information into a vector data series which is easy to execute map matching, a digital map data base 14 for accumulating digital map data, a map matching portion 13 for specifying a road section represented by the position information by executing map matching, a digital map displaying portion 15 for displaying the road section represented by the position information and an event position, an event inputting portion 16 for inputting information of an event which occurs, a position information converting portion 17 for generating position information for transmitting an even occurring position and a position information transmitting portion 18 for transmitting the generated position information to a position information receiving portion 22 of the other apparatus 20.

Figure 33:
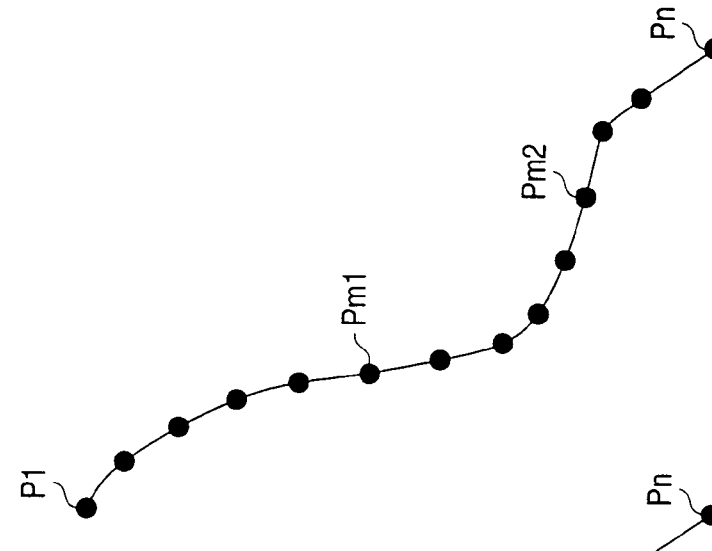
FIGS. 33(a), 33(b), and 33(c) illustrate views for explaining compression and decoding of shape data according to Tenth Embodiment.
Figure 33:
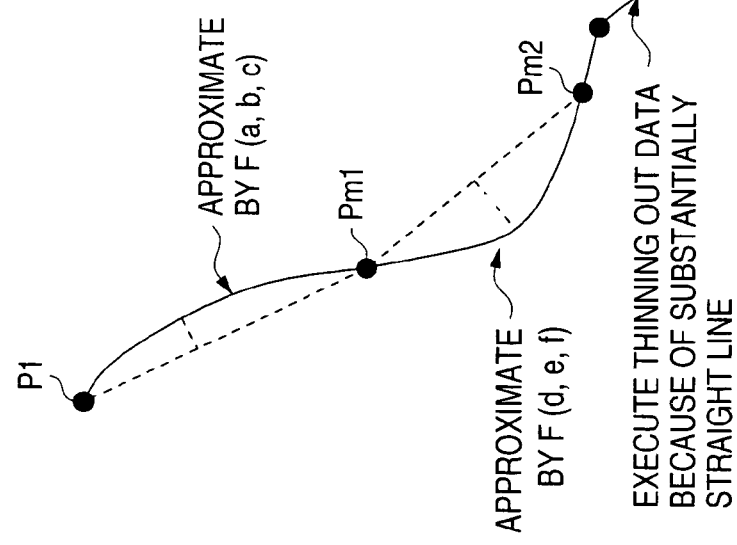
Figure 33:
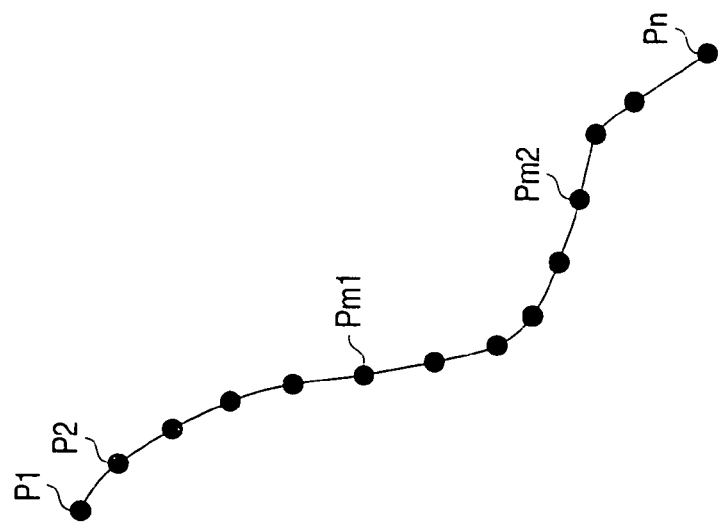

According to the apparatus 10, the position information receiving portion 11 receives the position information and the node series restoring portion 12 converts shape data subjected to data compression by approximation by a function included therein or thinning into a shape vector data series at equal intervals. FIG. 33(*a*) shows a shape vector data series before compression and FIG. 33(*b*) shows data compressed by thinning and function approximation. The node series restoring portion 12 restores a shape data series at equal intervals from data of FIG. 33(*b*) as shown by FIG. 33(*c*).

The map matching portion 13 detects a road section matched to the restored shape vector data series from map data accumulated in the digital map data base 14, further, specifies an event occurring position of the road section and displays these to the digital map displaying portion 15.

Further, when even information is inputted from the event information inputting portion 16, the position information converting portion 17 generates position information for designating the road section including the event occurring position and the even occurring position in the road section and the position information is transmitted from the position information transmitting portion 18.

An explanation will be given of specific operation of the node series restoring portion 12.

On the transmitting side, when the shape vector data series shown in FIG. 33(*a*) is acquired from map data, portions of the vector data series are approximated by a function F, further, at a linear portion, data is thinned to thereby transmit data having a compressed data amount.

Further, an explanation has been given of a method of approximating by the function F in Third Embodiment. Further, a detailed explanation has been given of a method of thinning data in Japanese Patent Application No. 242166/1999. In sum, among nodes included in the road section, nodes having a low degree of contributing to map matching are thinned and for such purpose, with regard to an azimuth from a contiguous node to a corresponding node, when a change in an azimuth from the corresponding node to a successive node is equal to or smaller than predetermined angle and a distance from the contiguous node to the corresponding node is less than a predetermined distance, the corresponding node is thinned.

By receiving data compressed in this way, the node series restoring portion 12 restores data at equal intervals as follows. In this case, data is restored such that the respective interval does not shift from a constant distance A (meter) by ±b (meter) or more.

Figure 47:
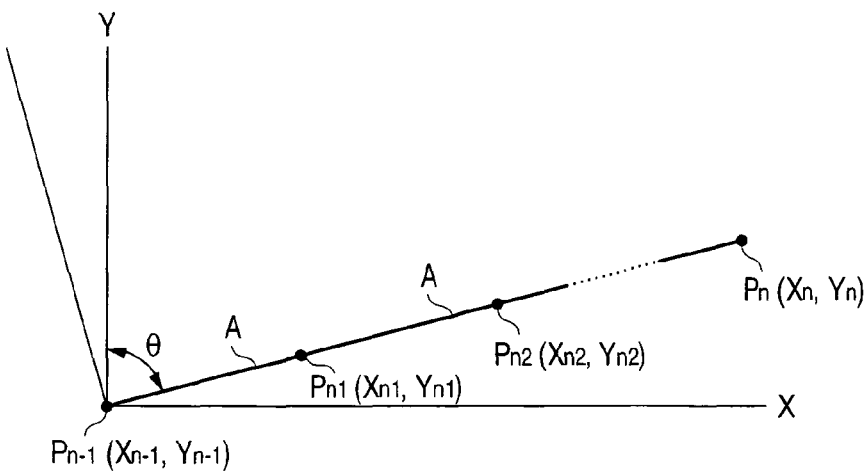
FIG. 47 is a view for explaining a method of restoring data in a section approximated by a straight line according to Tenth Embodiment.

At a section in which data is thinned, an interval between $P_{n-1}$ ($X_{n-1}$, $Y_{n-1}$) and $P_n(X_n, Y_n)$ is regarded as a straight line and points are generated at an interval of A meter. Such a pattern is shown in FIG. 47.

Here, when an azimuth from due north (Y direction) of $P_{n-1} \rightarrow P_n$ vector is designated by notation θ and generated points are designated by notations $P_{nm}$ (m=1, 2, 3, . . . ), the following relationships are established.

$$X_{nm} = X_{n-1} + m \times (A \sin \theta)$$

$$Y_{nm} = Y_{n-1} + m \times (A \cos \theta)$$

Figure 48:
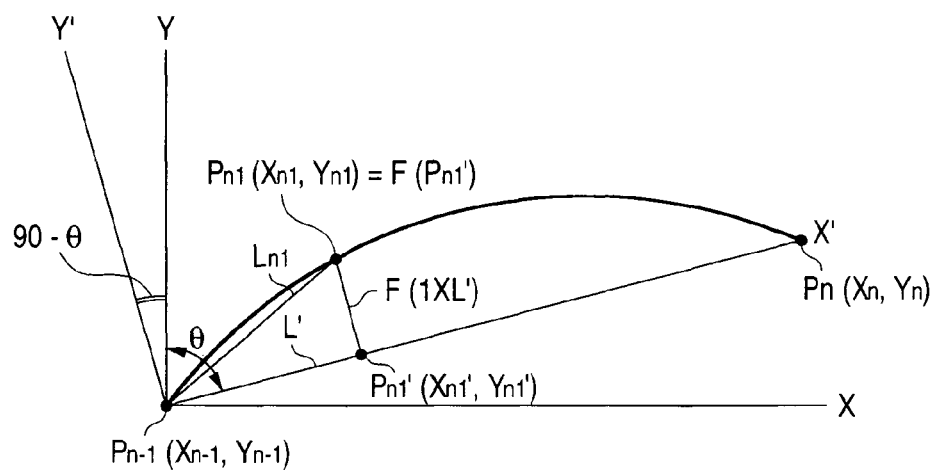
FIG. 48 is a view for explaining a method of restoring data at a section approximated by a function according to Tenth Embodiment.

Further, at a section in FIG. 9(*c*) approximated by a function of a basic function F, as shown by FIG. 48, there is calculated a position $P_{n-1}'$ ($X_{n1}'$, $Y_{n1}'$) advanced by L' (at initial time, L'=A−b) when an interval of $P_{n-1} \rightarrow P_n$ is assumed to be a straight line. In this case, coordinates of $P_{n1}'$ are as follows.

$$X_{n1}' = X_{n-1} + 1 \times (L' \sin \theta)$$

$$Y_{n1}' = Y_{n-1} + 1 \times (L' \cos \theta)$$

A point on the function F in correspondence with $P_{n1}'$ is designated by notation $P_{n1}$ (=F($P_{n1}'$)). Under an X'-Y' coordinates system defining $P_{n-1} \rightarrow P_n$ as X' axis and an axis passing $P_{n-1}$ and orthogonal to X' axis as Y' axis, an X' coordinate of $P_{n-1}$ is L' and a Y' coordinate of $P_{n-1}$ is F (1×L') When the X'-Y' coordinates system is rotated by an angle (90-θ) and coordinate values thereof are converted into coordinate values of an X-Y coordinates system, the coordinates of $P_{n1}$ ($X_{n1}$, $Y_{n1}$) are as follows.

$$X_{n1} = X_{n1}' + \{F(1 \times L') \sin(\theta - 90)\}$$

$$Y_{n1} = Y_{n1}' + \{F(1 \times L') \cos(\theta - 90)\}$$

Here, when a distance $L_{n1}$ between $P_{n-1} \rightarrow P_{n1}$ is within A+b (meter), the operation proceeds to calculation of $P_{n2}$ When the distance $L_{n1}$ $P_{n-1} \rightarrow P_{n1}$ is larger than A+b (meter), calculation is executed again by setting L'=L'/2.

Thereafter, the calculating method of binary search is repeated.

By such a processing of the node series restoring portion 12, the compressed data is converted into a coordinate series at equal intervals. Therefore, matching processing of the map matching portion 13 is facilitated.

The processing of the node series restoring portion 12 may be realized by software or may be realized by hardware formed by IC.

In this way, according to the method of the embodiment, a data series at equal intervals is restored from a data series subjected to data compression and therefore, the matching processing is facilitated and accuracy of map matching can be promoted.

Eleventh Embodiment

In Eleventh Embodiment, an explanation will be given of a method of transmitting position information for transmitting a shape other than that of a road of digital map data.

Figure 34:
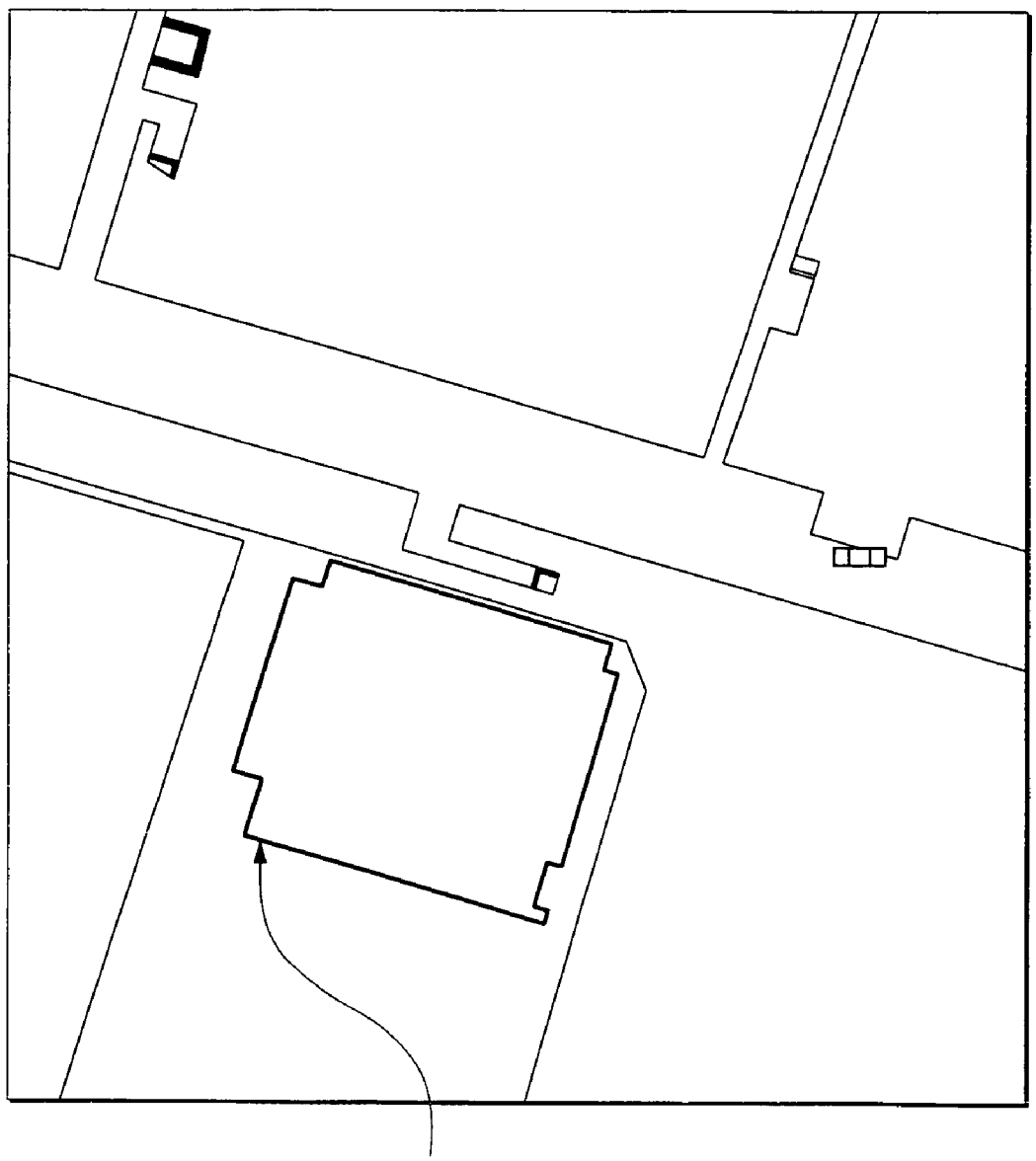
FIG. 34 is a view showing facility shape vectors in a digital map.

Digital map data include a vector series (V) representing a shape of a facility as shown by FIG. 34, a vector series (X) representing a shape of a prefectural boundary, a vector series (Y) representing a shape of a lake or marsh and a vector series (W) representing a shape of contour lines as shown by FIG. 35. These shapes can be displayed by utilizing the method of displaying a shape of a road which has been explained above, further, an event position thereof can be specified.

FIG. 36 shows shape data representing a shape of a house. A shape vector kind is described as house and an identification code of a building or a general house each described as detailed information. Successively, a node total number and respective node coordinates representing a shape of a house are described and an event occurring position is prescribed by a relative distance from a top node position.

FIG. 37 shows shape data representing a shape of a water area. A shape vector kind is described as water area and as detailed information, an identification code of a face expressing water area such as lake or a line expressing water area such as river is described. The other is the same as that in the case of a shape of a house.

FIG. 38 shows shape data representing a shape of an administrative boundary. A shape vector kind is described as administrative boundary and as detailed information, an identification code of a prefectural boundary, a city boundary, or town boundary is described.

Further, FIG. 39 shows shape data representing a shape of a contour line. A shape vector kind is described as contour line and as detailed information, an identification code of contour line meters above sea level is described.

By transmitting such position information, even when different kinds of digital maps are provided to the transmitting side and the receiving side, a house, a water area, an administrative boundary or a contour line can be identified by each other and an even occurring position can be transmitted to each other.

Twelfth Embodiment

In Twelfth Embodiment, an explanation will be given of a method of transmitting position information for transmitting a position other than that of a road on a digital map.

Figure 40:
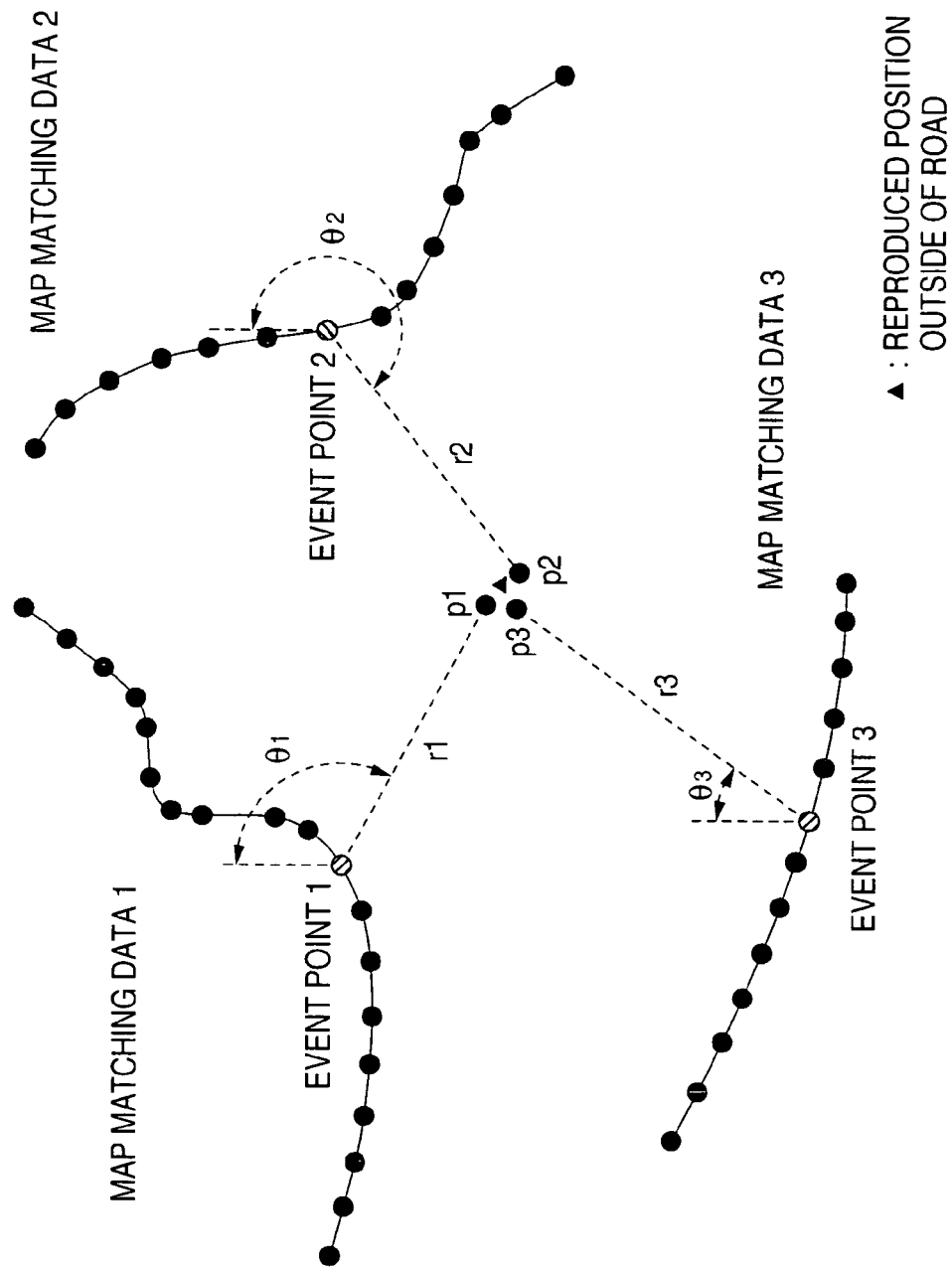
FIG. 40 is a view for explaining a method of expressing a position outside of a road according to Twelfth Embodiment.

As shown by FIG. 40, when a position (reproduced position) outside of a road indicated by a black triangle on a digital map is transmitted, the transmitting side sets three reference points (event point 1, event point 2, event point 3) and transmits to the receiving side, shape data of a road section (map matching data 1) including the event point 1, data of a distance $r_1$ and an azimuth $\theta_1$ from the event point 1 to the reproduced position, shape data of a road section (map matching data 2) including the event point 2, data of a distance $r_2$ and an azimuth $\theta_2$ from the event point 2 to the reproduced position, as well as, shape data of a road section (map matching data 3) including the event point 3 and data of a distance $r_3$ and an azimuth $\theta_3$ from the event point 3 to the reproduced position.

Figure 41:
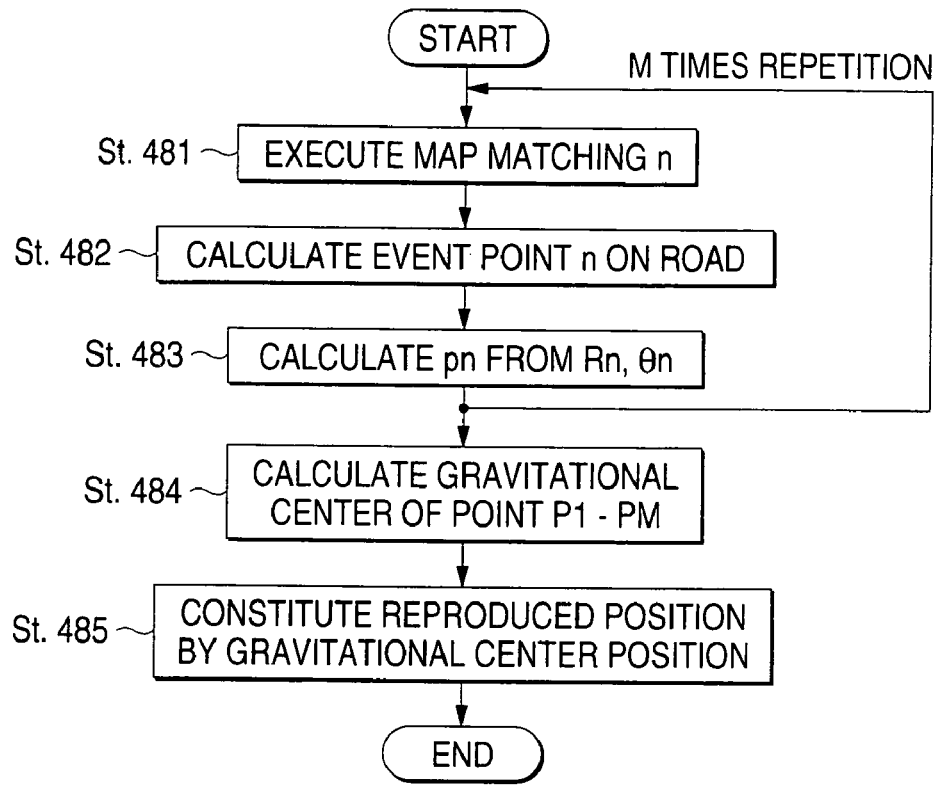
FIG. 41 is a flowchart showing a procedure of reproducing a position according to Twelfth Embodiment.

On the receiving side, the reproduced position is reproduced by a procedure shown in FIG. 41.

Step 481: Execute map matching by using map matching data 1,

Step 482: Specify event point 1 on road.

Step 483: Calculate spot $P_1$ disposed at distance $r_1$, azimuth $\theta_1$ from event point 1.

By repeating a similar procedure, the event point 2 is specified from the map matching data 2, a spot $P_2$ disposed at the distance $r_2$ and the azimuth $\theta_2$ from the event point 2 is calculated, the event point 3 is specified from the map matching data 3 and the spot $P_3$ disposed at the distance and $r_3$ and the azimuth $\theta_3$ from the event point 3 is calculated.

Step 484: Calculate gravitational center of point $P_1$, $P_2$, $P_3$,

Step 489: Constitute reproduced position by position of gravitational center.

Figure 42:
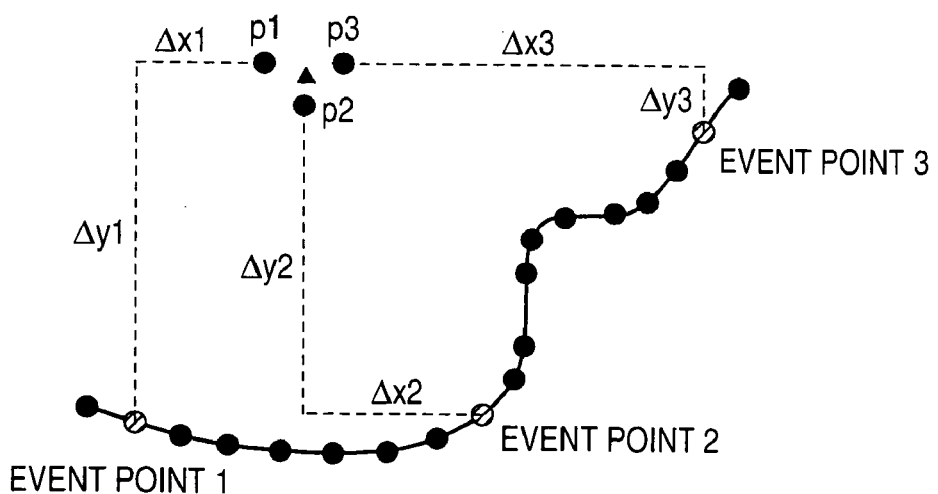
FIG. 42 is a view for explaining other method for expressing a position outside of a road according to Twelfth Embodiment.

Further, as shown by FIG. 42, the three event points may be set on a single road (map matching data). In this case, the reproduced position viewed from the respective event point can be expressed by using reference data ($\Delta x_n$, $\Delta y_n$) of an x coordinate and a y coordinate.

Figure 43:
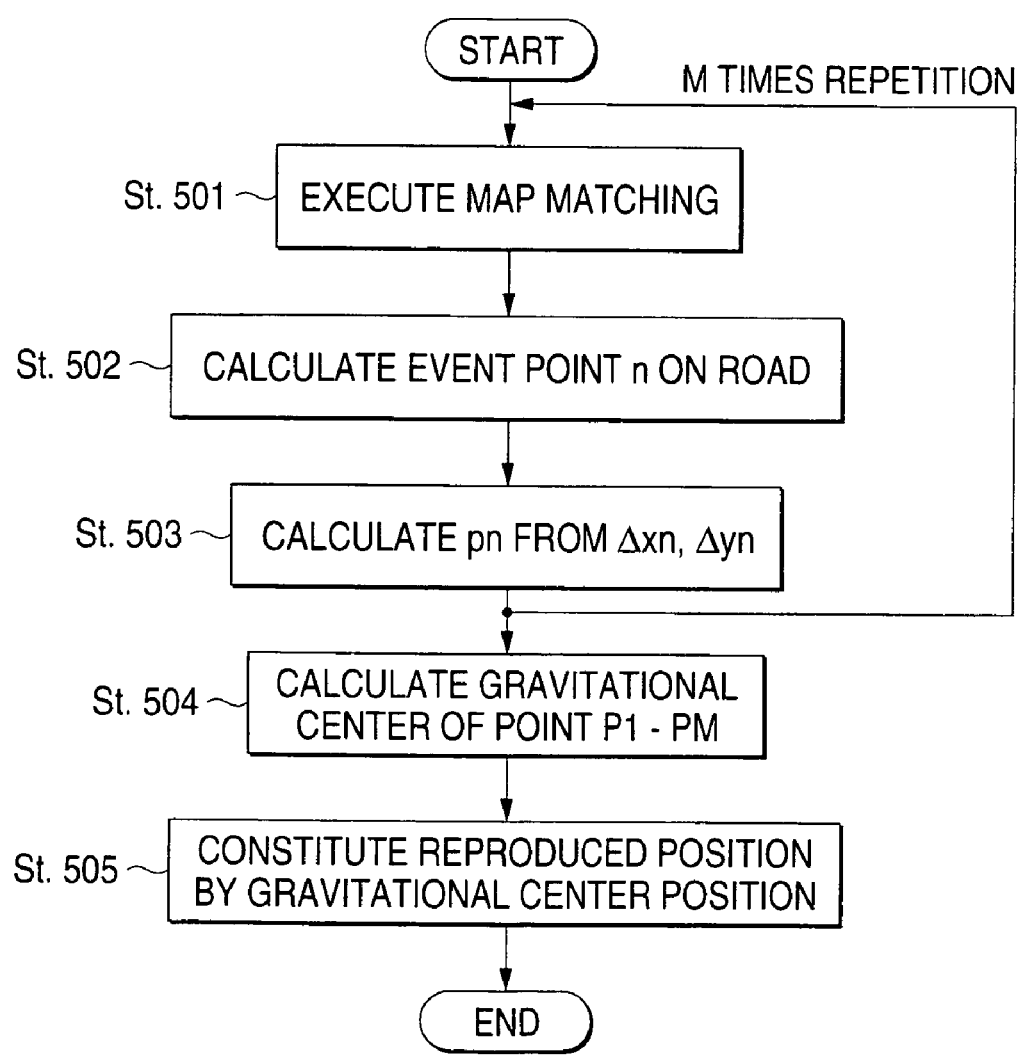
FIG. 43 is a flowchart showing other procedure of reproducing a position according to Twelfth Embodiment.

On the receiving side receiving the position information, the reproduced position is reproduced by a procedure shown in FIG. 43.

Step 501: Execute map matching by using map matching data,

Step 502: Specify event point 1 on road,

Step 503: Calculate spot $P_1$ at $\Delta x_1$, $\Delta y_1$, from even point 1.

Similarly, step 502 and step 503 are repeated and the spot $P_2$ at $\Delta x_2$, $\Delta y_2$, from the event point 2 and the spot $P_3$ at $\Delta x_3$, $\Delta y_3$, from the event point 3 are calculated.

Step 504: Calculate gravitational center of point $P_1$, $P_2$, $P_3$,

Step 505: Constitute reproduced position by position of gravitational center.

In this way, a position outside of a road can be represented. Further, as the map matching data, other than that of road, there can also be utilized vector series representing a shape of a facility explained in Third Embodiment, vector series representing a shape of a prefectural boundary, vector series representing a shape of a lake or marsh, or a vector series representing a shape of a contour line.

Further, although in this case, there is shown a case of transmitting relative information (information of distance and azimuth) from the three reference points to a target position, even when relative information from two reference points or one reference point is transmitted from the transmitting side, on the receiving side, the reference points can be specified with high accuracy on a digital map of its own and therefore, by the relative information from the reference points, the target position can be calculated statistically.

Further, although according to the respective embodiments, coordinates data of respective nodes included in shape data are represented by absolute values or relative values of longitude and latitude data, the coordinates data of the respective nodes may be represented by using other parameters.

Figure 49:
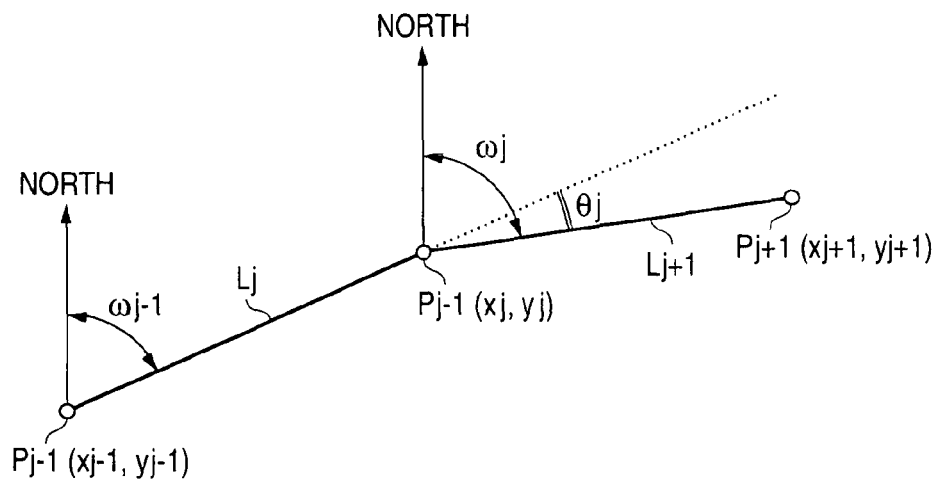
FIG. 49 is a view for explaining a method of expressing coordinates of a node by a distance and an argument between the node and a preceding node.

For example, as shown by FIG. 49, when there are present nodes $P_{j-1}$, $P_j$ and $P_{j+1}$ represented by xy coordinates as ($x_{j-1}$, $y_{j-1}$), ($x_j$, $y_j$) and ($x_{j+1}$, $y_{j+1}$), a distance of a straight line $P_{j-1} \rightarrow P_j$ is designated by notation $L_j$, an absolute azimuth (angle in clockwise direction with north as a reference) of the straight line $P_{j-1} \rightarrow P_j$ is designated by notation $\omega_{j-1}$, a distance of a straight line $P_j \rightarrow P_{j+1}$ is designated by notation $L_{j+1}$ and an absolute azimuth of the straight line P→$P_{j+1}$ is designated by notation $\omega_j$, the node $P_j$ can be specified by using the distance $L_j$ from the preceding node $P_{j-1}$ and the absolute azimuth $\omega_{j-1}$.

Here, $L_j$ and $\omega_{j-1}$ can be calculated from xy coordinate values of $P_{j-1}$ and $P_j$ by the following equations.

$$L_j = \sqrt{\{(x_j-x_{j-1})^2+(y_j-y_{j-1})^2\}}$$

$$\omega_{j-1} = \tan^{-1}\{(x_j-x_{j-1})/(y_j-y_{j-1})\}$$

Also the node $P_{j+1}$ can similarly be specified by using the distance $L_{j+1}$ from the preceding node $P_j$ and the absolute azimuth $\omega_j$.

Further, the node $P_{j+1}$ can also be specified by using the distance $L_{j+1}$ and an argument from the preceding node $P_j$, that is, an azimuth difference $\Theta_j$ between the absolute azimuth $\omega_j$ of $P_j$→$P_{j+1}$ and the absolute azimuth $\omega_{j-1}$ of $P_{j-1}$→$P_j$. The argument $\Theta_j$ can be calculated from respective coordinate values of $P_{j-1}$, $P_j$ and $P_{j+1}$ by the following equation.

$$\Theta_j = \omega_j - \omega_{j-1}$$
$$= \tan^{-1}\{(x_{j+1}-x_j)/(y_{j+1}-y_j)\} - \tan^{-1}\{(x_j-x_{j-1})/(y_j-y_{j-1})\}$$

FIGS. 50(a), 50(b), and 50(c) exemplify transmitted data representing node series information included in shape data by using a distance and an argument from a preceding node. The transmission data of FIG. 50(a) includes data of interpolation points #1 through #a between a node $p_1$ and a node $p_2$ and the data of the interpolation points are constituted by data of distances and arguments from preceding nodes or preceding interpolation points. With regard to the node $p_1$ constituting a start end, the node $p_1$ includes data of absolute coordinates (longitude, latitude) representing a position and an absolute azimuth in a intercept direction (absolute azimuth of a straight line connecting $p_1$ and the interpolation point #1). Further, data of the interpolation point #1 includes an argument data representing an argument difference between an absolute azimuth of a straight line extending from the interpolation point #1 to the interpolation point #2 and the absolute azimuth in the intercept direction, and distance data from $p_1$ to the interpolation point #1 and data of the interpolation point #2 is similarly constituted by using an argument data of an absolute azimuth of a straight line extended from the interpolation point #2 to the interpolation point #3 and the absolute azimuth of the straight line extended from the interpolation point #1 to the interpolation point #2 and distance data from the interpolation point #1 to the interpolation point #2. The same goes with the interpolation points #3 through #a.

Further, according to transmitted data of FIG. 50 (b), data of respective nodes excluding the node $p_1$ at the start end are constituted by distances and arguments from preceding nodes.

FIGS. 51(a) and 51(b) schematically show a shape (a) of an object road section of original map data and a coordinate series (b) representing the shape by distances and arguments from preceding nodes. Further, as shown by FIGS. 51(a) and 51(b), the nodes capable of reproducing the shape of the object road section by a smaller number from the original map data of the object road section may be resampled and the resampled nodes may be expressed by the distances and arguments from the preceding nodes.

Figure 52:
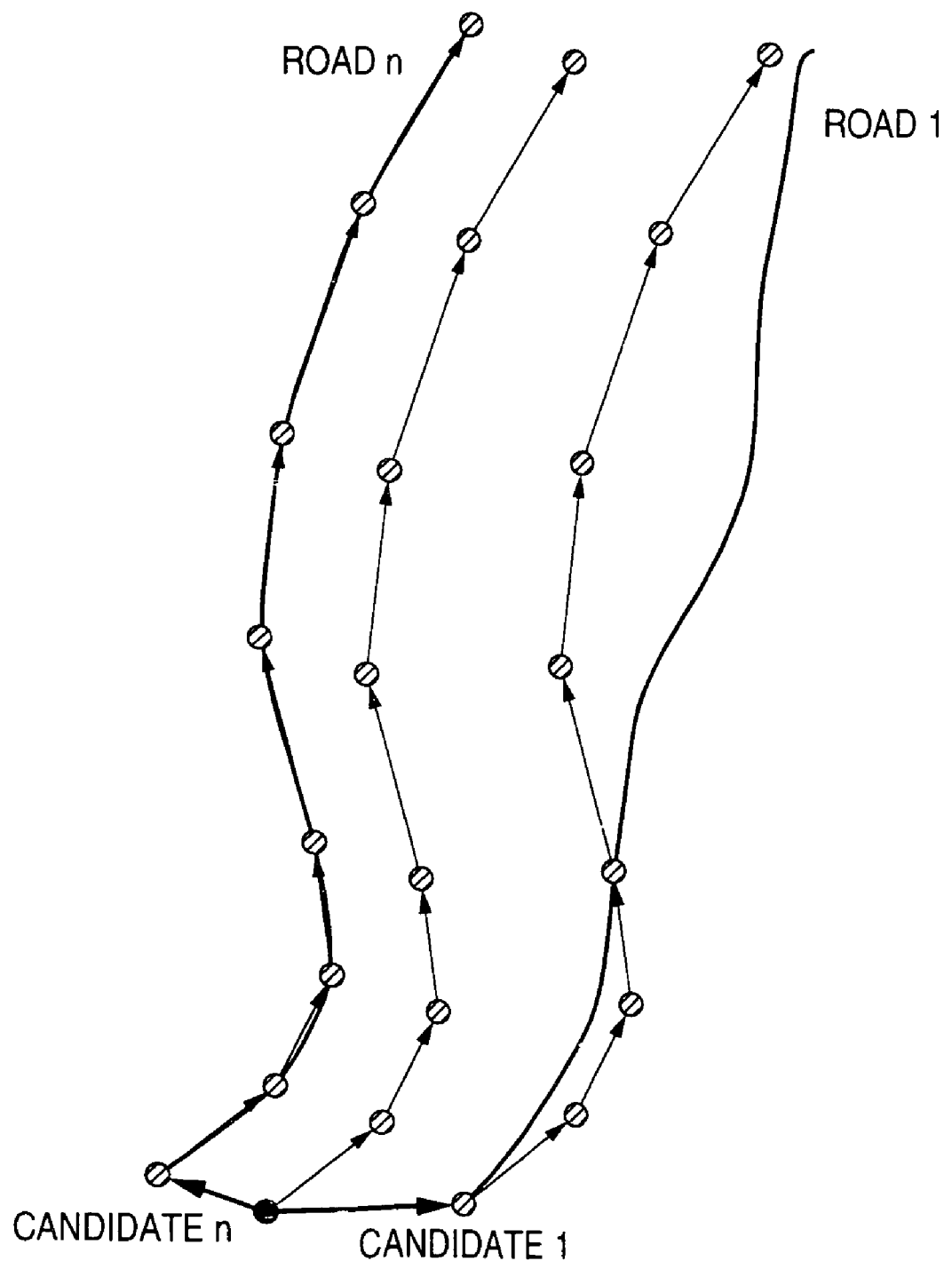
FIG. 52 is a view schematically showing a map matching processing when coordinates of a node are represented by a distance and an argument between the node and a preceding node.

FIG. 52 schematically shows a map matching processing on the receiving side receiving the transmitted data. According to the map matching, on a digital map of its own, firstly, candidate points in correspondence with a start end node $p_1$ of shape data are set. For that purpose, n pieces of candidates are set on n pieces of contiguous nodes substantially within 200 m from a latitude and longitude data position of the start end node $p_1$.

Next, distances $D_1$ from the position of the start end node $p_1$ to respective candidates $P_{1,1}$ are calculated.

Figure 53:
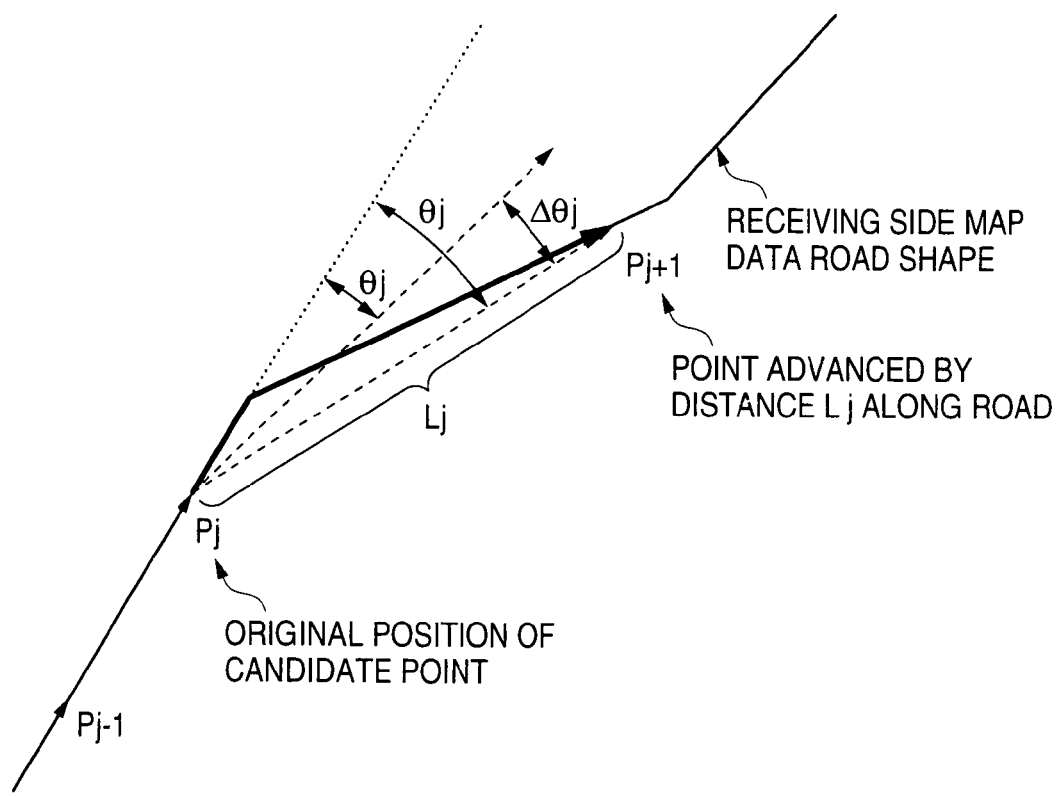
FIG. 53 is a view showing a way of calculating a successive candidate point in the map matching processing when the coordinates of the node are represented by the distance and the argument between the node and the preceding node.

Next, as shown by FIG. 53, there is calculated a point $P_{j+1,1}$ advanced from a current candidate point $P_{j,1}$ of respective road by a distance $L_j$ of an interval $p_j$→$p_{j+1}$ of shape data along the road, there are calculated an angle $\theta_{j,1}$ made by a straight line connecting $P_{j-1,1}$→$P_{j,1}$ and a straight line connecting $P_{j,1}$→$P_{j+1,1}$ and a difference □$\Delta\theta_{j,1}$□ between the angle $\theta_{j,1}$ and a relative azimuth $\Theta_j$ of $p_j$ represented by the shape data and an evaluation value $\epsilon_{j,1}$ is calculated by the following equation.

$$\epsilon_{j,1} = \alpha \times D_1 + \Sigma(\beta \times □\Delta\theta_{j,1}□)$$

($\Sigma$ designates addition of J=1 to j)
α: predetermined coefficient
β: predetermined coefficient.

Next, the candidate point $P_{j,1}$ is moved to the candidate point $P_{j+1,1}$.

Such a processing is repeated for all of the candidate points, further, a similar processing is executed for all of nodes included in the shape data. When the processing has been finished for all of the nodes included in the shape data, a candidate having the least operation value $\epsilon_i$ is selected as the object load.

According to the map matching processing, by using "distance $L_1$ from the preceding node" included in shape data, a successive candidate point can easily be calculated, further, the evaluation value can be calculated by directly using "relative azimuth" included in the shape data. Therefore, processing load of the map matching on the receiving side is alleviated.

Further, according to the method of transmitting position information of the invention, operational procedures of computer on transmitting side and receiving side apparatus can be realized by prescribing the procedure by programs.

While only certain embodiments of the invention have been specifically described herein, it will be apparent that numerous modifications may be made thereto without departing from the spirit and scope of the invention.

The present invention is based on Japanese Patent Applications No. 2000-375320 filed on Dec. 8, 2000, and No. 2001-220062 filed on Jul. 19, 2001, which are incorporated herein by references.

INDUSTRIAL APPLICABILITY

As apparent from the above-described explanation, according to the method of transmitting position information of a digital map of the invention, positions of the digital map can efficiently and accurately be transmitted.

According to a method of transmitting shape data by adding azimuth information, height information or one way traffic information by a direction identifying flag, accuracy of matching can be promoted and a necessary period of time of matching can be shortened.

Further, according to a transmitting method for approximating a shape data series by a function or displaying shape data of a double-streaked line by an offset distance, a data amount can be reduced and a data transmission efficiency can be promoted.

Further, according to a transmitting method for displaying a relative distance up to an event position by setting a reference point at a crossroads or the like in a road section, or prescribing an event position by a node number, accuracy of specifying the event position on the receiving side can be promoted.

Further, by using a direction identifying flag, a direction of advancing a vehicle influenced by an event can be specified.

Further, according to a method and apparatus for restoring data at equal intervals from a compressed shape data series, a matching efficiency on the receiving side can be promoted.

Further, according to the transmitting method of the invention, travel time can be transmitted, further, data can be transmitted in the form of not infringing copyright of map data.

Further, the invention is applicable also to transmission of vector data other than that of a road, further, a position outside of a road on a digital map can also be transmitted.

What is claimed is:

1. A system for identifying a road segment, which is specified on a transmitting side digital map stored in a transmitting apparatus, on a receiving side digital map stored in a receiving apparatus and different from said transmitting side digital map, said system comprising:

said transmitting apparatus that creates location information and transmits said created location information to said receiving apparatus, wherein said location information includes coordinate series information which represents a road shape of said road segment by coordinates of intersections included in said road segment and coordinates of nodes located on one or more links between two adjacent intersections of said intersections, and azimuth information which represents an azimuth of a curve of said road shape at each of said intersections and said nodes; and said receiving apparatus that receives said location information and identifies said road segment on said receiving side digital map by matching each of said intersections and said nodes included in said transmitted location information with a point of each of one or more matching candidate points located on a road of said receiving side digital map, wherein said matching candidate points are proximate to each of said intersections and said nodes to be matched and selected so that an azimuth difference between an azimuth of said road of said receiving side digital map at each of said matching candidate points and said azimuth of said curve of said road shape at each of said intersections and said nodes to be matched is smaller than a prescribed value.

2. The system according to claim 1, wherein said azimuth of said curve of said road shape is an intercept azimuth at each of said intersections and said nodes, and said azimuth of said road of said receiving side digital map is an intercept azimuth at each of said matching candidate points.

3. A transmitting apparatus for transmitting said location information to said receiving apparatus in said system according to claim 1.

4. A receiving apparatus for identifying said road segment represented by said location information received from said transmitting apparatus in said system according to claim 1.

* * * * *

UNITED STATES PATENT AND TRADEMARK OFFICE
CERTIFICATE OF CORRECTION

PATENT NO. : 8,086,401 B2  
APPLICATION NO. : 11/133591  
DATED : December 27, 2011  
INVENTOR(S) : Shinya Adachi Page 1 of 1

It is certified that error appears in the above-identified patent and that said Letters Patent is hereby corrected as shown below:

In column 14, line 51, delete "Pn-1" and instead insert -- Pn1 --.

In column 14, line 51, insert a -- . -- before "When".

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,086,401 B2
APPLICATION NO. : 11/133591
DATED : December 27, 2011
INVENTOR(S) : Shinya Adachi It is certified that error appears in the above-identified patent and that said Letters Patent is hereby corrected as shown below:

On the first page, section (62), insert --as application No. PCT/JP01/10748-- after "filed".

Signed and Sealed this
Twelfth Day of June, 2012

David J. Kappos
*Director of the United States Patent and Trademark Office*